United States Patent
Krauss et al.

(10) Patent No.: US 11,472,038 B2
(45) Date of Patent: *Oct. 18, 2022

(54) MULTI-DEVICE ROBOT CONTROL

(71) Applicant: X-Tend Robotics Inc., Middleburg, FL (US)

(72) Inventors: Gavriel Krauss, Beit Shemesh (IL); Harry Fox, Jerusalem (IL)

(73) Assignee: X-Tend Robotics Inc., Middleburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,861

(22) Filed: Nov. 25, 2020

(65) Prior Publication Data

US 2021/0221006 A1 Jul. 22, 2021

Related U.S. Application Data

(63) Continuation of application No. 16/747,525, filed on Jan. 20, 2020, now Pat. No. 10,889,002, which is a
(Continued)

(51) Int. Cl.
*G05B 19/042* (2006.01)
*B25J 13/00* (2006.01)
(Continued)

(52) U.S. Cl.
CPC .......... *B25J 13/006* (2013.01); *G05B 19/042* (2013.01); *H04L 63/08* (2013.01);
(Continued)

(58) Field of Classification Search
CPC ........ B25J 13/006; B25J 11/008; B25J 13/06; G05B 19/042; G05B 2219/45103;
(Continued)

(56) References Cited

U.S. PATENT DOCUMENTS

| 9,250,003 B2 | 2/2016 | Kim et al. |
| 10,668,652 B2 | 6/2020 | Hummel |

(Continued)

FOREIGN PATENT DOCUMENTS

| JP | 2002354139 | 12/2002 |
| JP | 2003006532 A | 1/2003 |

(Continued)

OTHER PUBLICATIONS

International Search Report and Written Opinion in related International Patent Application No. PCT/US2018/043165, dated Jan. 11, 2018, 8 pages.

(Continued)

*Primary Examiner* — Jason Holloway
(74) *Attorney, Agent, or Firm* — Heidi Brun Associates Ltd.

(57) ABSTRACT

Systems, methods, and related technologies are disclosed for multi-device robot control. In one implementation, input(s) are received and provided to a personal assistant or another application or service. In response, command(s) directed to an external device are received, e.g., from the personal assistant. Based on the command(s), a robot is maneuvered in relation to a location associated with the external device. Transmission of instruction(s) from the robot to the external device is initiated.

16 Claims, 13 Drawing Sheets

Related U.S. Application Data continuation of application No. PCT/US2018/043165, filed on Jul. 20, 2018.

(60) Provisional application No. 62/535,122, filed on Jul. 20, 2017, provisional application No. 62/535,116, filed on Jul. 20, 2017.

(51) Int. Cl.
    *H04L 9/40*       (2022.01)
    *G06N 3/00*       (2006.01)

(52) U.S. Cl.
    CPC ........... *G05B 2219/45103* (2013.01); *G05B 2219/50391* (2013.01); *G06N 3/008* (2013.01)

(58) Field of Classification Search
    CPC ......... G05B 2219/50391; H04L 63/08; G06N 3/008; G08B 13/19647; G08B 15/00; G05D 1/028; G05D 2201/0209; G06F 1/163; G06F 1/1632; G06F 1/1626

See application file for complete search history.

(56) References Cited

U.S. PATENT DOCUMENTS

| | | | |
|---|---|---|---|
| 2005/0287038 A1 | 12/2005 | Dubrovsky et al. | |
| 2006/0184279 A1* | 8/2006 | Okamoto | B25J 5/007 700/245 |
| 2009/0082879 A1 | 3/2009 | Dooley et al. | |
| 2012/0310463 A1 | 12/2012 | Jeong et al. | |
| 2014/0099613 A1* | 4/2014 | Krauss | G06N 3/008 434/236 |
| 2014/0254896 A1 | 9/2014 | Zhou et al. | |
| 2015/0197015 A1 | 7/2015 | Lee et al. | |
| 2015/0283702 A1 | 10/2015 | Izhikevich et al. | |
| 2016/0066759 A1 | 3/2016 | Langhammer et al. | |
| 2016/0204953 A1 | 7/2016 | Kim et al. | |
| 2017/0092030 A1 | 3/2017 | Badger, II | |
| 2017/0129099 A1 | 5/2017 | Alduaiji et al. | |
| 2017/0282362 A1 | 10/2017 | Erhart et al. | |
| 2017/0286916 A1 | 10/2017 | Skiba et al. | |
| 2018/0029809 A1* | 2/2018 | Lee | A47L 9/2852 |
| 2018/0043532 A1 | 2/2018 | Lection et al. | |

FOREIGN PATENT DOCUMENTS

| | | |
|---|---|---|
| JP | 2007221300 A | 8/2007 |
| JP | 2013250005 A | 12/2013 |
| JP | 2014142742 A | 8/2014 |
| KR | 101659037 B1 | 9/2016 |
| WO | 2015108819 A1 | 7/2015 |
| WO | 201614547 | 9/2016 |

OTHER PUBLICATIONS

English translation of 2002354139 downloaded from the Japanese Patent Office dated Jul. 20, 2021.

Extended European Search Report issued in corresponding European application 18834991.4 dated Jul. 26, 2021.

English translation of JP2013250005 downloaded from Google Patents on Feb. 21, 2022.

English translation of 2007221300 downloaded from Google Patents on Feb. 21, 2022.

English translation of JP2003006532 downloaded from Google Patents on Feb. 21, 2022.

* cited by examiner

500

Surveillance video camera captures real-time video feed
502

Robot performs visual analysis on real-time video feed to detect anomaly
504

Robot sends control signal to a connected smart device and moves to vicinity of video camera if anomaly is detected
506

Robot take wide angle surveillance video in the vicinity of video camera
508

Robot performs visual analysis of 360 degrees surveillance video to corroborate anomaly and alert user of the same
510

*FIG. 5A*

MULTI-DEVICE ROBOT CONTROL

CROSS-REFERENCE TO RELATED APPLICATIONS

This application is a continuation of U.S. patent application Ser. No. 16/747,525, filed Jan. 20, 2020, which is a continuation of International Application No. PCT/US2018/043165, filed on Jul. 20, 2018 and published as WO/2019/018810 on Jan. 24, 2019, which is related to and claims the benefit of U.S. Patent Application No. 62/535,116, filed Jul. 20, 2017, and U.S. Patent Application No. 62/535,122, filed Jul. 20, 2017, each of which is incorporated herein by reference in its entirety.

TECHNICAL FIELD

Aspects and implementations of the present disclosure relate to multi-device robot control, e.g., in conjunction with a surveillance robot.

BACKGROUND

Various robotic devices are capable of maneuver throughout physical spaces. Such robots can integrate sensors such as cameras and microphones.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 5A is an example flow chart illustrating aspects of how device(s) can work synergistically with a robot in providing surveillance.

DETAILED DESCRIPTION

Figure 1:
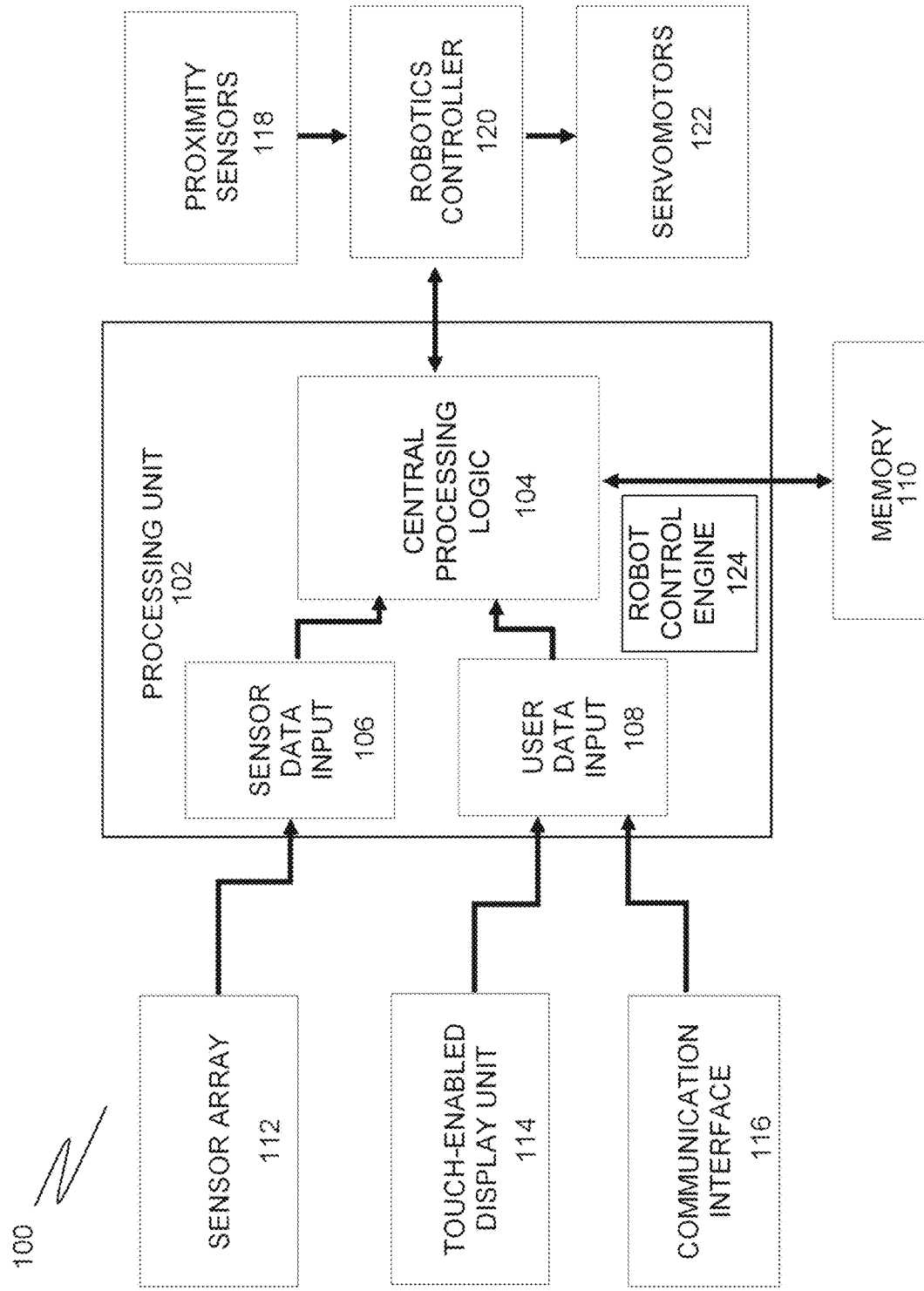
FIG. 1 is an example block diagram of a robot system.

Aspects and implementations of the present disclosure are directed to multi-device robot control.

Internet connected devices such as video cameras and other sensors can be installed in home or office settings, e.g., in order to provide surveillance. A drawback of these devices/cameras is that they can require substantial installation efforts. Further, these devices/cameras generate vast amounts of data, e.g., in the form of video feeds to be stored remotely (e.g., via cloud services). However, cloud storage is limited and slow due to download latency, bandwidth limitations, etc. While local storage may also be utilized, it is more expensive than cloud storage due to the need to store a large amount of data. As such, maintaining the vast amounts of generated surveillance data is a problem for many users. In addition to video cameras, many other network/internet-connected devices such as smart electricity meters, smart air conditioners, smart lights, etc. can generate data that utilizes vast amounts of storage but have limited storage and offline data saving options.

In addition to using internet connected video cameras for surveillance, various robot technologies can perform certain surveillance and other security tasks, e.g., on behalf of a human user (e.g., when the user is not at home or in the office). However, such technologies may only be configurable when the user is able to engage in direct communication with the surveillance robot in close proximity through visual, auditory or physical communication means. One drawback is that the user may be unable to utilize the surveillance robot to send information to and receive information from the robot remotely without being in close proximity.

Additionally, current technologies may only allow the surveillance robot to be controlled by a single controller. However, this may not be ideal as multiple users may wish to have simultaneous access to the surveillance robot for performing one or more security-related tasks remotely. Further, there are also other applications, other than those related to surveillance, in which providing remote and multiple user access to a robot is useful. Some examples of these applications can be found in settings such as a hospital (e.g., for robots to assist in providing healthcare such as transporting patients), in industrial settings (e.g., for robots to perform repetitive tasks such as lifting heavy objects), etc.

A further drawback of current surveillance robot technologies is that they may be unable to optimally utilize existing surveillance resources for implementing a security task. Further, such existing technologies may be unable to function as a central platform to provide the user with offline surveillance data storage, online viewing management and automatic visual processing. Even further, existing surveillance robot technologies may only be controlled directly by a touchscreen or programmed commands and may be unable to understand spoken commands and extract robot tasks from everyday speech.

Therefore, there exists a need for a better solution to address the aforementioned shortcomings. Accordingly, described herein in various implementations are technologies, including systems, methods, and machine readable mediums, that enable multi-device robot control. The described technologies provide numerous advantages, as described in detail herein.

It can therefore be appreciated that the described technologies are directed to and address specific technical challenges and longstanding deficiencies in multiple technical areas, including but not limited to robotics, multi-device control, and surveillance. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

One example implementation of the described technologies is shown in FIG. 1, depicting a system 100 for controlling a robot. The system 100 may include processing unit 102, sensor array 112, touch-enabled display unit 114, communication interface 116, memory 110, robotics controller 120, servomotor(s) 122 and proximity sensor(s) 118. The processing unit 102 may include a central processing logic 104, a sensor data input 106 and a user data input 108.

In various implementations, the sensor data input 106 can be an interface operable to receive sensor input data from a sensor array 112 and the user data input 108 can be an interface operable to receive user input data from a touch-enabled display unit 114 and from a communication interface 116 that can support wired and wireless connection(s) to other local devices or for connection to the internet. The sensor array 112 may include: a video camera (not shown) for local imaging capability, a microphone for recording sounds and voice commands from the user, an infra-red sensor for detecting the presence of humans, laser scanners, laser strip detectors, global positioning system and short-range radar, etc.

As shown in FIG. 1, processing unit 102 can also include or incorporate robot control engine 124. Robot control engine 124 can be, for example, an application, module, instructions, etc., executed and/or otherwise implemented by processing unit 102 and/or central processing logic 104 to enables the operations and functionality described herein.

The central processing logic 104 is operable to process the input data from the sensor data input 106 and user data input 108, e.g., according to a set of pre-defined instructions or rules otherwise commonly known as a computer program or software. Further, the central processing logic 104 may use logic to extract robot tasks from audio commands that are received through the microphone that is part of the sensor array 112. Thereafter, the central processing logic 104 may send control signals to other components of the robot based on the results from the processing of the input data.

In various implementations, the central processing logic 104 may be in bi-directional communication with a robotics controller 120. The robotics controller 120 may receive control signals or instructions from the central processing logic 104 in addition to proximity data from functionally associated or otherwise integrated proximity sensors 118. Thereafter, the robotic controller 120 may generate and send control signals to servomotors 122 to effect various mechanical tasks, operations, or actions. Examples of such tasks include navigation of the robot, and moving/lifting of objects. The robotic controller 120 may also be operable to transmit feedback signals to the central processing logic 104 for further processing.

Figure 2:
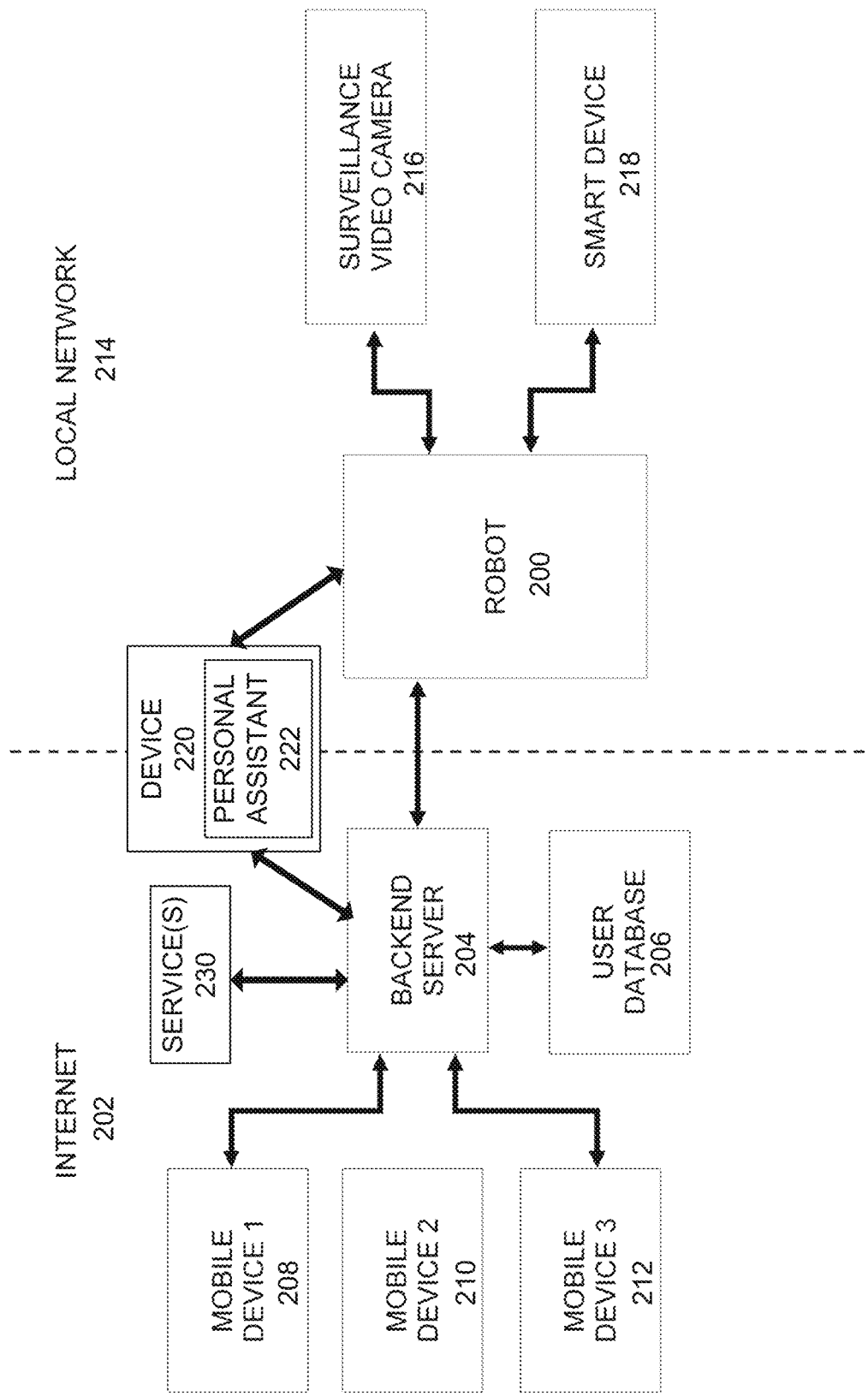
FIG. 2 is an example block diagram illustrating how a robot system connects to other devices within the home or local network and mobile devices via an external communication network.

As described herein, in various implementations, the locomotive ability of a robot (e.g., robot 200 as shown in FIG. 2) to navigate by virtue of the servomotors 122 coupled with local imaging and sensing capabilities through the sensor array 112 enables the robot 200 to provide active surveillance throughout a location (e.g., a house).

In various implementations, the central processing logic 104 may also communicate with a memory 110 for storing and retrieval of processed or input data. Memory 110 can be, for example, non-volatile or volatile memory used to store information for use in a computer. Non-limiting examples of non-volatile memory include random-access memory (RAM), flash memory, read-only memory (ROM), programmable read-only memory (PROM), erasable programmable read-only memory (EPROM) and electrically erasable programmable read-only memory (EEPROM). Non-limiting examples of volatile memory include random-access memory (RAM), dynamic random-access memory (DRAM) and static random-access memory (SRAM). In other implementations, memory 110 can be implemented at an external device such as a server or via a service such as a cloud storage service. In other implementations, memory 110 can be implemented within a distributed or decentralized system/environment (e.g., using blockchain and/or other such distributed computing/storage technologies). In various implementations, the central processing logic 104 may generate and/or provide content to the touch-enabled display unit 114 for displaying video/audio and/or other output to a user. The central processing logic 104 may also send data or control signals wirelessly to other devices through the communication interface 116.

In various implementations as shown in FIG. 2, robot 200, through the communication interface 116 of the robot system 100, may also be connected via a local network 214 with various external devices. Examples of such external devices include sensor(s) 216 (such as an external surveillance video camera) and smart device 218. In certain implementations, local network 214 can include Bluetooth connection, WiFi or wireless LAN (WLAN) connection, wired LAN connection, Near Field Communication (NFC) connection, or other types of wireless or wired connection(s). Smart device 218 may be an electronic device that may have wireless and/or wired connection and may operate interactively with robot 200 or autonomously. Further, it may be appreciated that, in certain implementations, surveillance video camera 216 can be physically located external to the robot and is to be distinguished from a local video camera included as part of sensor array 112 (as shown in FIG. 1).

As also shown in FIG. 2, robot 200 may also be connected, through a device such as backend server 204 accessed via a wide area network 202 such as the internet or mobile communication network, to various mobile devices 208, 210 and 212. Such remote connectivity enables the described robot system 100 to be remotely controlled or configured via the referenced devices 208, 210 and 212. Non-limiting examples of network/internet connections that the referenced device(s) can be connected to include: dial-up, digital subscriber line, cable, wireless, satellite access and cellular access.

The disclosed technologies are described with respect to embodiments that address various technical problems and shortcomings. Among these problems are challenges with respect to remote access or control of a robot. One example problem is ensuring that a mobile device can locate or communicate with a robot over the internet, e.g., in a scenario that the robot is mobile (and thus located in different places) and may not have a static network address. Another example problem is how to provide secure remote communication between the robot and mobile device e.g., in order to limit access to the robot to authorized users and prevent unauthorized access/control.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 3:
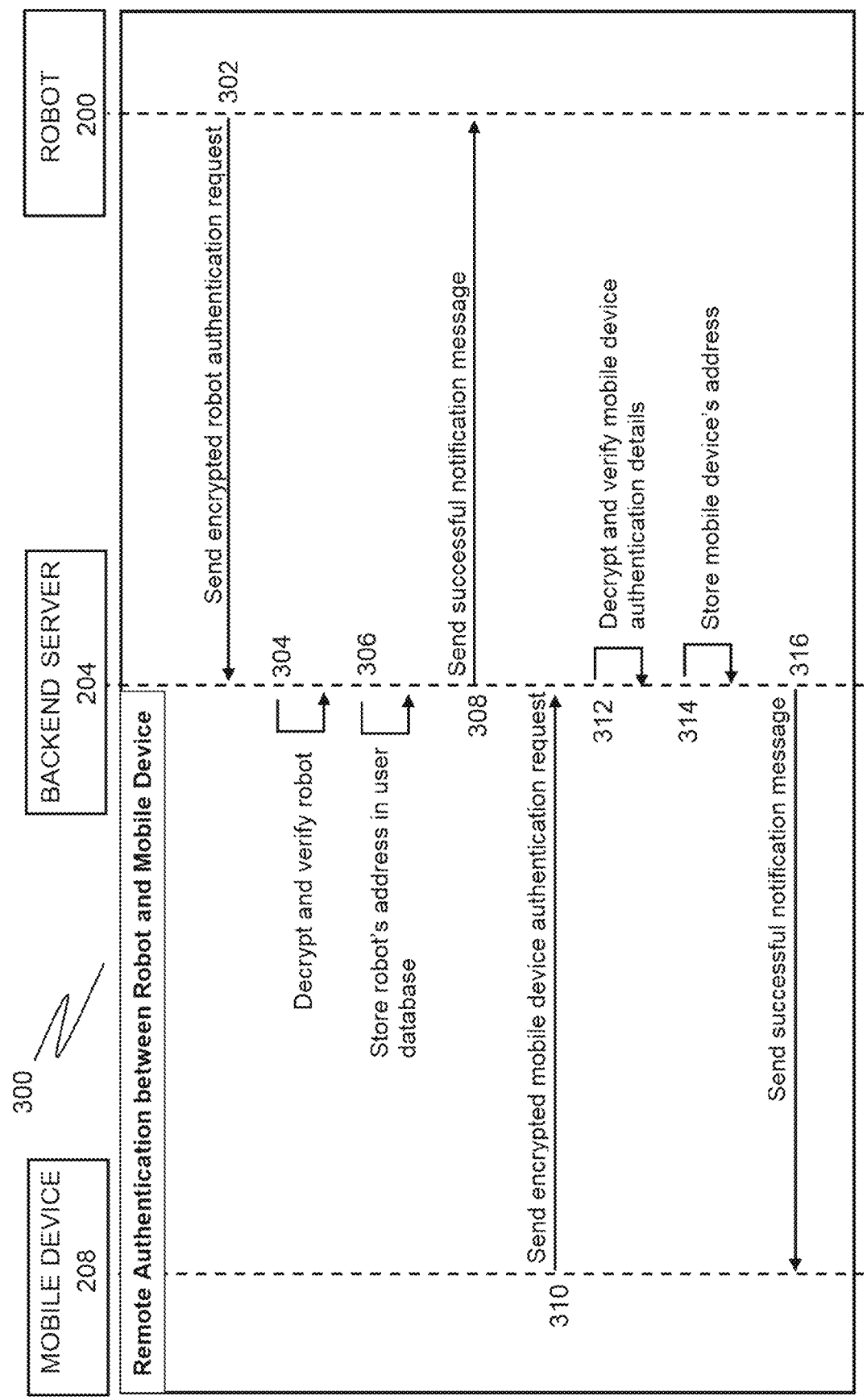
FIG. 3 is an example schematic representation of aspects of remote authentication between a robot and a mobile device.

In various implementations of operation as shown in FIG. 3, there is a remote authentication process/method 300, e.g., as implemented through the backend server 204 (or via another machine/device, such as those described herein). Such a method can enable mobile device 208 to determine the network location of the robot 200 via the internet and also to authenticate pre-authorized or registered users and robots. The method is performed by processing logic that can comprise hardware (circuitry, dedicated logic, etc.), software (such as is run on a computing device such as those described herein), or a combination of both. In certain implementations, various operations described herein can be performed by server 204 which may execute various applications (e.g., robot control engine 124).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 302, the robot 200 may send an encrypted robot authentication request to the backend server 204. The encrypted robot authentication request can contain a unique robot identifier associated with the robot and the current network address (e.g., internet protocol (IP) address) of the robot 200. The robot authentication request may be encrypted by a first robot authentication key. Such a request can be received by server 204.

At operation 304, the backend server is operable to decrypt the received robot authentication request, e.g., using a second robot authentication key to identify and verify the identity of the robot using a unique robot identifier and a user database 206 which can contain a list of authorized robots together with their corresponding unique robot identifier and recent network address(es). Further, the first robot authentication key and the second robot authentication key may be an asymmetrical public-private key pair wherein the first authentication key is a private key and the second authentication key is a corresponding public key.

At operation 306, the backend server 204 can store or update the network address entry of the robot 200 under its unique robot identifier in the user database 206. At operation 308, the backend server 204 may send a successful notification message to the robot at operation 308 upon successful authentication and update. Upon the conclusion of operation 308, the backend server 204 can contain the most updated network address of the robot 200.

In a similar manner as described at operations 310 and 316, the backend server 204 that is in communication with the user database 206 may also authenticate and update the network address of the mobile device 208. In various implementations, the mobile device 208 may send an encrypted mobile device authentication request at operation 310 to the backend server 204. The encrypted mobile device authentication request may contain the mobile device's unique identifier, a unique message, a unique phrase, a unique gesture or any form of biometric data. The backend server 204 may then decrypt and verify the mobile device's authentication details contained within the authentication request by querying the user database 206. Upon successful authentication of the mobile device 208, the backend server 204 may then store or update the mobile device's current network address in the user database 206. In various implementations, there may be one or more authorized mobile devices (208, 210 and 212) associated with a single robot 200.

Figure 4:
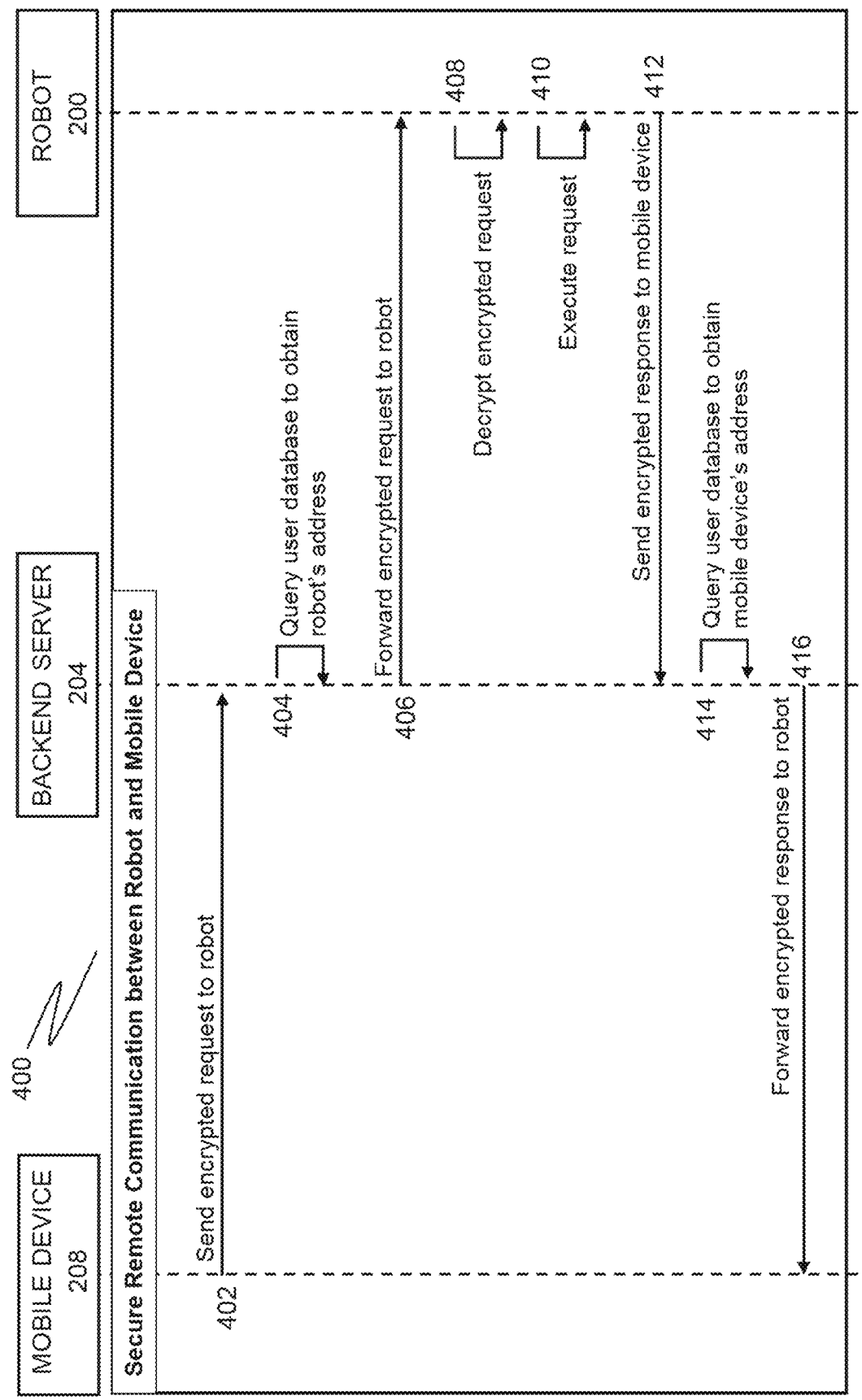
FIG. 4 shows an example of how remote communication between a robot and a mobile device is achieved.

After mobile device 208 is successfully authenticated at operation 316, various secure remote communication operations, processes, and/or protocols 400 can be implemented, such as shown in FIG. 4. Such secure remote communication operations, processes, and/or protocols can, for example, enable secure communication between the mobile device 208 and robot 200.

At operation 402, mobile device 208 may send an encrypted request to robot 200 to perform a certain task, operation, command, etc. (e.g. a surveillance or security-related task). The nature of these tasks may be mechanical and/or electronic. Non-limiting mechanical tasks may be navigating the robot from one place to another, lifting or moving an object and adjusting the position of a local sensor. Non-limiting examples of electronic tasks may include sending a control signal to control the operation of a smart device 218 and retrieving and displaying data from the memory 110. Such a request can be received by robot 200.

The encrypted request sent to robot 200 (e.g., at operation 402) can be received by backend server 204. At operation 404 server 204 can query the database to obtain the robot's most updated network address.

At operation 406 backend server 204 can forward the encrypted request via the robot's network address. At operation 408, robot 200 can receive the encrypted request, and decrypt and process the request. At operation 410 the robot can implement or execute the task according to the request.

At operation 412, robot 200 can send an encrypted response to mobile device 208 through the backend server 204, e.g., after the request or task is implemented successfully. At operation 414, backend server 204 can query user database 206 to obtain the network address of the target mobile device 208 and, at operation 416, forward the encrypted response to the mobile device 208 via the network address. In various implementations, the encrypted request to the robot 200 can be accompanied by the unique identifier of the mobile device 208 to enable backend server 204 to determine the correct network address of the target mobile device 208 (e.g., if there are at least two authorized mobile devices associated with a robot 200).

In various implementations, the described technologies can enable the robot to be connected with and control a plurality of devices (such as a surveillance video camera 216 and smart devices 218) connected on the local network, which can provide further technical advantages. For example, such configurations can enable the robot to operate as a central hub or platform to enable a user to remotely access multiple smart electronic devices installed in a household via a single interface. For example, the user may issue a control signal remotely via a robot to perform various operations with respect to other peripheral devices (including peripheral devices that may not be directly accessible via an internet connection). By way of illustration, a user (via a mobile device) can provide a command to the robot to provide command(s) to another device that may not be reliably accessible via an internet connection (e.g., a command to turn on or off a smart heater, air-conditioner, lighting or television). In doing so, the robot can, for example, maneuver to a location at which the robot can establish a connection (e.g., Bluetooth, NFC, etc. connection) with respect to such devices, and provide the command.

In various implementations, surveillance video camera 216 and smart device 218 may have limited storage and offline data saving options and the robot 100 may provide additional storage through memory 110 by downloading/receiving data captured by such camera(s)/device(s) and storing it locally (e.g., on memory 110). Additionally, the robot 200 may also have a storage-unifying software solution to consolidate smart devices 218 using different cloud technologies to enable further storage and/or streaming functions. In various implementations, robot 200 may also support the steaming, analyzing and storing of video and other content transmitted by/received from sensors/surveillance video cameras 216 and/or other devices.

The described technologies can enable the robot to be connected with a plurality of smart devices 218 and surveillance video cameras 216 which can provide further technical advantages. For example, robot 200 can utilize/leverage existing digital resources and infrastructure to implement a task complementarily and synergistically.

For example, FIG. 5A illustrates a non-limiting method 500 depicting how a security or surveillance task can be implemented synergistically. In certain implementations, such a task can be performed via the combined or complementary operations of robot 200, surveillance video camera 216 and/or connected smart device 218.

At operation 502, surveillance video camera 216 (which may be wirelessly connected) can capture real-time content/video (e.g., a feed of a region of interest within the house or office).

At operation 504, the real-time video/feed (e.g., as captured at 502) can be transmitted (e.g., wirelessly) to the robot system 100 (e.g., in real-time) for further processing. Robot system 100 can receive the referenced video/fed and central processing logic 104 can perform visual analysis on the received video feed (e.g., in real time). In doing so, anomaly detection can be performed, e.g., using image recognition or detection techniques as implemented/executed by the central processing logic 104. For example, central processing logic 104 can implement an image recognition or detection program to detect for the presence of a human in the video/feed and may further perform facial recognition to determine if the identity of the human is known (or whether the human is an intruder).

At operation 506, the robot can send a control signal to a wirelessly-connected smart device 218 in the vicinity of the intruder (e.g., if the human is identified at 504 as a potential intruder) as part of the security task. For example, the robot can send a control signal to switch on a smart lighting device or sound a smart alarm in the room where the potential intruder is detected. The robot 200 can also send a control signal to the surveillance video camera 216 to zoom in on the intruder for further investigation.

In various implementations, the robot may also utilize its locomotive/navigational capabilities to move or navigate to the vicinity of the intruder at operation 506 to provide additional surveillance.

At operation 508, the robot can capture further content (e.g., a wide angle surveillance video) for further investigation, e.g., when in the vicinity of the potential intruder.

At operation 510, additional processing (e.g., visual analysis) can be performed by robot 200 (e.g., via central processing logic 104). For example, the wide angle surveillance video taken by the robot can be processed to corroborate the detected anomaly (e.g., to confirm that the potential intruder is indeed someone who is unidentified/unauthorized). In various implementations, the user or owner can be alerted through a message that is sent to the mobile device 208 if the anomaly is corroborated or confirmed.

It should be further appreciated that variations and combinations of features described above may be combined to form yet further embodiments falling within the scope of the described technologies. For example, although the mobile devices 208, 210 and 212 are described in the above embodiments to be connected to the robot via the internet, it is to be appreciated that the mobile devices 208, 210 and 212 may also connect to the robot the local network 214. In this local network control mode, backend server 204 may not necessarily be required to establish connection between the mobile devices 208, 210 and 212 and the robot 200. The local network 214 may include Bluetooth connection, WiFi or wireless LAN (WLAN) connection, wired LAN connection or other similar types of wireless or wired connection.

The described robot control system may further include an interactive robotics controller adapted to convert an interaction instruction into interactive speech, text, visual and/or gesture output.

The described robot can be configured to integrate or support additional devices. For example, the robot can be configured to implement additional communication protocols as they are standardized. In doing so, the robot can use such protocols to communicate with and be controlled by an ever increasing number of devices.

Various networking or wireless networking protocols mentioned herein are intended as examples. The robot may be adapted to work along practically any home/office/mobile/wireless networking solution.

The example of connecting devices and robots based on IP addresses is also a non-limiting example. Practically any network addressing technology can be used to connect a robot and registered local and/or mobile devices.

The backend server 204 and user database 206 may be disposed within a cloud service or implemented as physical entities.

In various implementations, the user database 206 may also be located locally on the robot 200. In such implementations, authentication operations 310-316 can be performed locally on the robot 200 (e.g., instead of via the backend server 204).

In certain implementations the described technologies can configure robot 200 to function as a hub of internet-of-things (IOT) devices. Such functionality can be further enhanced with the integration of various devices or services that provide personal assistant functionality. For example, as shown in FIG. 2, robot 200 can interface or otherwise communicate with device 220 via a local/direct connection or via the internet. Device 220 can be a connected device that includes or implements one or more personal assistants such as personal assistant 222.

Personal assistant 222 can be an application or module that configures/enables the device to interact with, provide content to, and/or otherwise perform operations on behalf of a user. For example, personal assistant 222 can receive communications and/or request(s) from a user and present/provide responses to such request(s). In certain implementations, personal assistant 222 can also identify content that can be relevant to a user (e.g., based on a location of the user or other such context) and present such content to the user. Personal assistant 222 can also enable a user to initiate and/or configure other application(s). For example, a user can provide a command/communication to personal assistant 222 (e.g., 'play jazz music'). In response to such command, personal assistant 222 can initiate an application (e.g., a media player application) that fulfills the request provided by the user. Personal assistant can also initiate and/or perform various other operations, such as are described herein. In certain implementations, device 220 may be configured to provide multiple personal assistants, each of which may be associated with different operating systems, platforms, networks, and/or ecosystems.

In various implementations, the described technologies may utilize, leverage and/or otherwise communicate with various services such as service 230 as shown in FIG. 2. Such service(s) can be, for example, third-party services that can enable the retrieval of content that may enhance or otherwise be relevant to certain operations described herein. Additionally, in certain implementations such services can be services that the user may communicate/interact with, etc.

It should be noted that while various components (e.g., personal assistant 222) are depicted and/or described as operating on a device 220, this is only for the sake of clarity. However, in other implementations the referenced components can also be implemented on other devices/machines. For example, in lieu of executing locally at device 220, aspects of personal assistant 220 can be implemented remotely (e.g., on a server device or within a cloud service or framework). By way of illustration, personal assistant 222 can operate in conjunction with service 230, which can be a personal assistant service which executes on a remote device or devices. In doing so, personal assistant 222 can, for example, request or receive information, communications, etc., from personal assistant service 230, thereby enhancing the functionality of personal assistant 222. In other implementations, robot 200 can be configured to execute personal assistant 222. For example, robot control engine 124 (as shown in FIG. 1) can be configured to integrate and/or provide functionality associated with personal assistant 222. In doing so, the robot can utilize services associated with the personal assistant while further integrating/incorporating the maneuverability, wide range of sensors, and other capabilities and advantages associated with the robot. Accordingly, features of the referenced personal assistant further enhance operation of the robot, while features of the robot further enhance operations of the personal assistant.

Figure 5B:
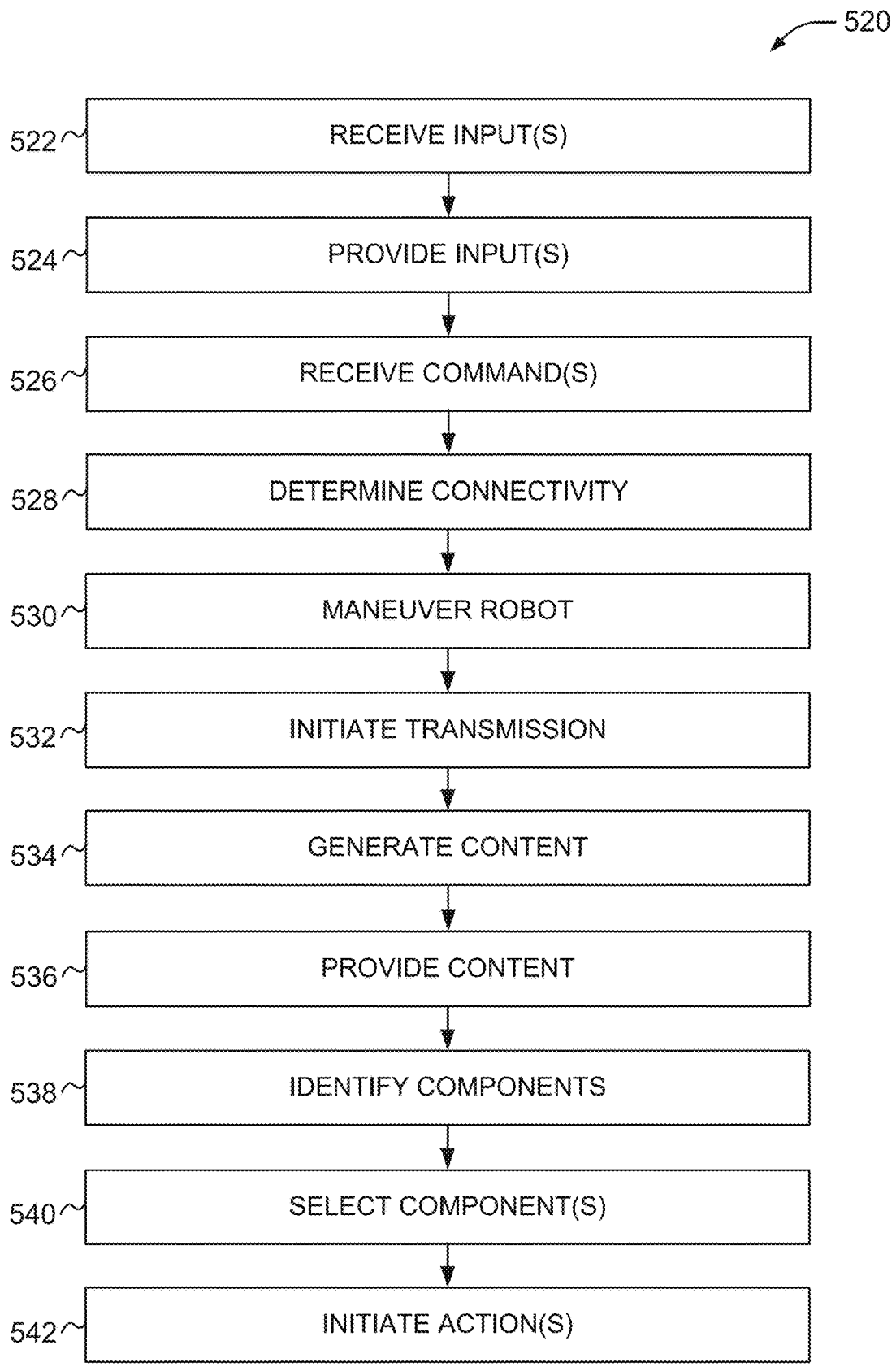
FIG. 5B is a flow chart illustrating a method, in accordance with an example embodiment, for robot control.

FIG. 5B is a flow chart illustrating a method 520, according to an example embodiment, for robot control. The method is performed by processing logic that can comprise hardware (circuitry, dedicated logic, etc.), software (such as is run on a computing device such as those described herein), or a combination of both. In one implementation, the method 520 is performed by one or more elements depicted and/or described in relation to FIGS. 1-2 (including but not limited to robot 200, robot control engine 124, processing unit 120, personal assistant 222, etc.), while in some other implementations, the one or more blocks of FIG. 5B can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 522, one or more inputs are received. In certain implementations, such inputs (e.g., voice inputs originating from a user) can be received by the described robot, personal assistant, etc.

In certain implementations, a first set of inputs can be received. Such inputs can be processed (e.g., at the robot) to compute one or more quality metrics associated with the one or more first inputs. For example, the level of background noise in captured audio content or the sharpness/image quality of an image can be computed. Based on the computed quality metrics, various adjustments can be initiated with respect to the robot, as described herein. For example, upon determining that a first sensor captured audio content with a substantial amount of background noise, another sensor can be utilized and/or the robot can maneuver to another location to capture content with less noise. Further aspects and examples of the described functionality are provided herein.

At operation 524, one or more inputs (e.g., as received at 522) can be providing to another application, service, device, etc., such as a personal assistant, as described herein.

At operation 526, one or more commands can be received. In certain implementations, such commands can originate from another application, service, device, etc., such as a personal assistant, as described herein. Additionally, in certain implementations such commands can be directed to an external device (e.g., an IoT device). For example, such commands can reflect that a user wishes to adjust or turn off a connected appliance, etc., as described herein.

At operation 528, a connectivity status of the external device can be determined. For example, as described herein, while a user may instruct a personal assistant to adjust operation of a connected appliance, such connected appliance may not be reliably connected to the internet. Accordingly, upon receiving such a request from the user, a connectivity status of the connected appliance can be determined.

At operation 530, a robot can be maneuvered. In certain implementations, such robot can be maneuvered in relation to a location associated with the external device (e.g., in closer proximity to the connected appliance). Moreover, in certain implementations such robot can be maneuvered based on the one or more commands. Additionally, in certain implementations the robot can be maneuvered in relation to the location of the connected appliance/device based on the connectivity status of the external device. For example, upon determining that the appliance/device is not reliably connected, the robot can maneuver to a location closely proximate to the appliance and establishing a connection with the external device (e.g., via Bluetooth, NFC, etc., as described herein).

At operation 532, a transmission can be initiated. In certain implementations, such a transmission can be a transmission of one or more instructions from the robot to the external device/appliance, as described herein. For example, the robot can provide an instruction to the device (via Bluetooth, etc.).

Moreover, in certain implementations content originating from the external device can be requested via the robot. For example, in a scenario in which a remote surveillance camera or sensor is capturing video or other inputs and is not reliably connected to the internet (or another network), the robot can maneuver to a closely proximate location and request such content from the device. The content can then be provided to the robot/received from the external device, and the content can be stored at the robot. The robot can then upload, relay, etc. such content to one or more devices, services, etc., as described herein.

At operation 534, confirmation content can be generated. In certain implementations, such confirmation content (e.g., photographic evidence) can reflect that the one or more instructions were executed by the external device, as described herein.

At operation 536, the confirmation content can be provided, e.g., to the personal assistant or to another device or service.

At operation 538, one or more components accessible to the robot can be identified. Such components can be, for example, one or more sensors integrated within the robot, one or more sensors integrated within a device in communication with the robot, or one or more sensors external to the robot, and/or other such sensors, components, devices, etc., such as are described herein.

At operation 540, at least one of the one or more components can be selected. In certain implementations, such components (e.g., a sensor or device) can be selected based on/in view of the one or more commands. For example, in a scenario in which a task directed to a robot specifies certain parameters (e.g., to capture a picture having certain characteristics, e.g., high quality, close up, etc.) the components (e.g., sensor) accessible to the robot that is best suited for such a task can be selected (as well as various settings, configurations, etc., of such component), as described herein.

At operation 542, one or more actions can be initiated, e.g., with respect to the at least one of the one or more components (e.g., the component(s) selected at 540). For example, such selected components can perform various operations, as described in detail herein.

By way of further illustration of the described operations and features, robot 200 can connected to or interface with a personal assistant via device 220 and/or service 230. Such a personal assistant can be, for example, a cloud-based virtual voice assistant. In doing so, a user can utilize such a personal assistant to interact with or control robot 220, e.g., using natural language interfaces provided by the personal assistant. For example, a user can provide a voice command to the personal assistant such as "[PERSONAL ASSISTANT], tell [ROBOT] to come to me." The personal assistant can serve as a intermediary to facilitate remote commands with natural speech.

The described technologies can also be configured to enable interactions with and/or control of various devices (e.g., IoT devices such as connected thermostats, lights, etc.). For example, a user can provide a voice command to robot 200 (e.g., "[PERSONAL ASSISTANT], please set the living room thermostat temperature to 68 degrees."), and such command can be processed via the referenced personal assistant, while also being carried out/executed via the robot (e.g., by providing a corresponding command to smart device 218).

By way of further illustration, the described robot can be further configured to operate or function as a 'hub' that can interface with and/or control various smart/connected devices, including those that may not have consistent network connectivity. For example, in a scenario in which a smart/connected appliance is located in an area without network connectivity (or in a scenario in which such connectivity is interrupted), it may be difficult or impossible to control such device remotely. However, using the described technologies, a user can, for example, provide a command (e.g., via a personal assistant) directed to such appliance (e.g., "turn off the air conditioner in the bedroom"). Using the described technologies, such a command can be directed to robot 200, which can then be maneuvered to the referenced location ("bedroom"). Even though the referenced appliance may have lost internet connectivity, robot 200 can establish a local connection with the device (e.g., via Bluetooth, etc.), by virtue of its close proximity. The robot can further relay the referenced command (e.g., to turn off the appliance), confirm such operation was performed (e.g., via feedback from the device, photographic or other evidence/documentation, etc.), and provide such confirmation back to the personal assistant, user, etc. In doing so, the described technologies can expand the capabilities and enhance the functionality and reliability of personal assistants and smart/connected devices (e.g., IoT devices), beyond the capabilities such technologies were capable of when operating independently.

In certain implementations, robot 200 can be configured to expand the capabilities of a personal assistant, e.g., when employed in offline or online modes. In an online assistant configuration (in which robot 200 maintains consistent network connectivity, e.g., with a personal assistant service), the robot can provide enhanced sensor capabilities to improve performance.

For example, in certain implementations robot 200 can be configured to enable a mobile microphone solution to provide more coverage throughout the home (e.g., in lieu of installation of IoT hubs in every room). The robot can, for example, maneuver to different locations/rooms within a home, and utilize its sensor(s) (camera, microphone, etc.) to receive inputs, commands, etc. Using the various communication interfaces of the robot, the robot can further provide commands to other devices (e.g., IoT devices such as connected appliances, lights, etc.). In doing so, a single robot can provide IoT capabilities to multiple areas that would otherwise need several stationary IoT hubs to achieve comparable coverage.

Moreover, the maneuverable nature of robot 200 can further enable the robot to adjust its location/position to account for different circumstances (e.g., within a room). For example, in a scenario in which a microphone of the robot is perceiving a substantial amount of background noise or if a camera is perceiving too much (or not enough) light, robot 200 can adjust its position accordingly, to enable the described operations to be performed in an improved/enhanced fashion.

In certain implementations, the referenced robot can be further configured to operate as an 'offline' (e.g., not network connected) personal assistant. In such scenarios, robot 200 can provide a microphone array front-end various processing capabilities otherwise provided via a personal assistant cloud-based service, but without an internet connection. For example, robot 200 can be configured to receive certain commands from a user in one room (e.g., in an area without network connectivity). The robot can then maneuver to another area/room to establish a network connection, relay the received commands to the personal assistant service, and receive response(s). The robot 200 can then return to the user's area and provide the received response(s).

Moreover, in certain implementations robot 200 can be configured to enable multiple modes whereby a trigger can switch between the modes, e.g., based on a user's intent (as determined from speech and/or gesture patterns in addition to keywords and or wake-words). The referenced robot can also have multiple modes whereby a trigger (e.g., a button or switch physically located on the robot, a virtual button in an associated mobile application) can switch between the modes. In certain implementations, the robot can operate in concurrent modes, e.g., to facilitate multiple possible inputs at a given time.

As noted, robot 200 can be configured with networking modes including: (1) Online (internet connected) mode with VPN, (2) LAN active mode (without internet connectivity) and (3) Hotspot mode.

Figure 6:
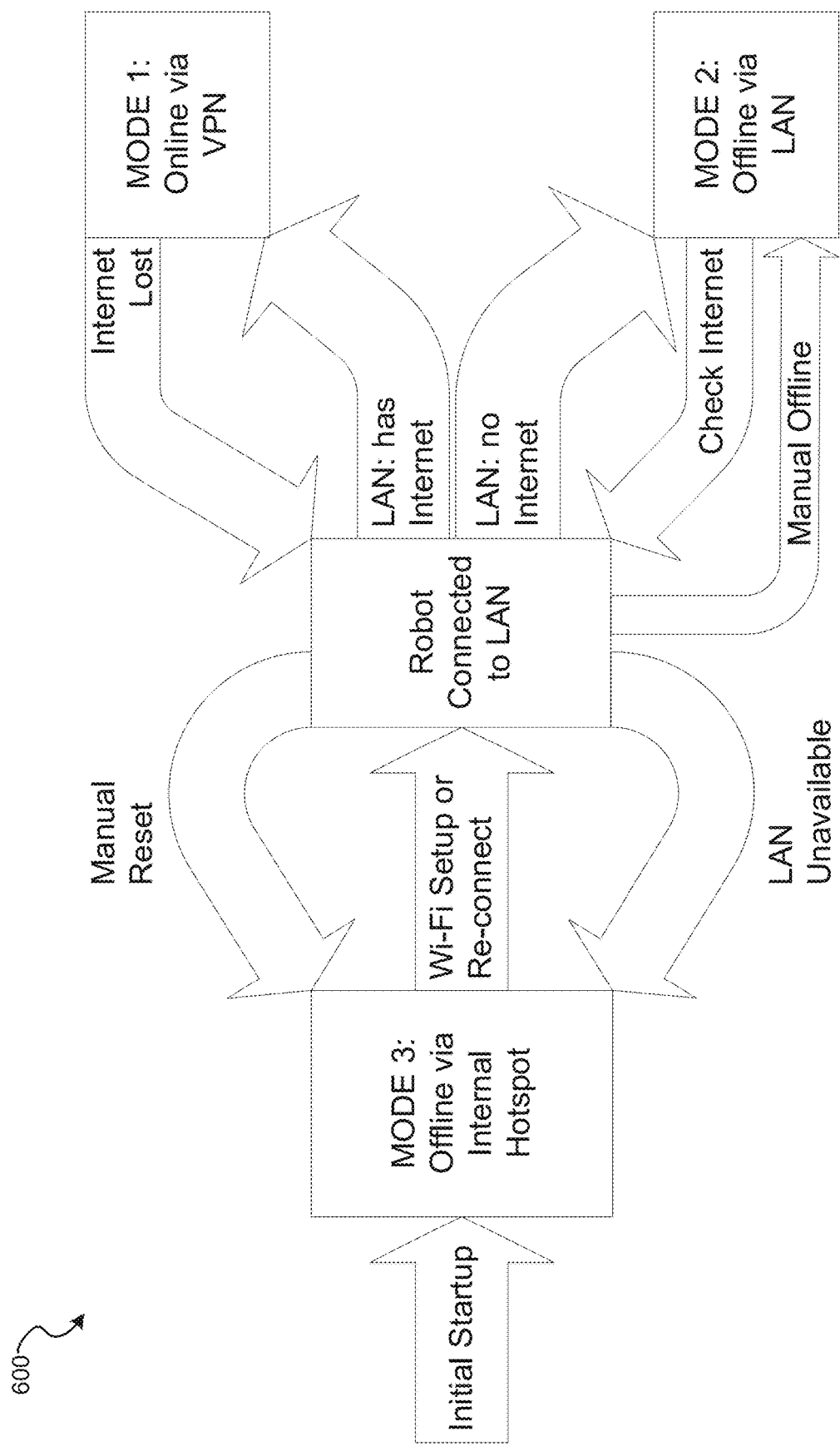
FIG. 6 is an example flow chart illustrating aspects of various modes of operation of an IoT robot, as described herein.

An example flow diagram 600 depicting the referenced operation modes and related operations is shown in FIG. 6. As shown in FIG. 6, in certain implementations, an IoT-capable/connected robot can be initialized via the hotspot—direct Wi-Fi connection (e.g., to a connected mobile application). Such an application (which may run on a user device such as a smartphone, tablet, etc., connected to the robot via the referenced local hotspot enabled by the robot) can give a user the ability to register the IoT robot on an available LAN.

As shown in FIG. 6, once the robot is registered on a LAN, the robot can be registered with a VPN backend for online connectivity and accessibility. A mobile application (which may run on a user device such as a smartphone, tablet, etc., connected to the robot) can choose to connect to the robot via the LAN directly (offline) or through the VPN. A user can manually switch the robot connectivity to a different LAN or re-enable robot hotspot. If the LAN becomes unavailable, the robot can automatically switch to the hotspot connectivity mode, as shown in FIG. 6.

The referenced IoT robot 200 can be registered with backend server 204 to provide a processing and database solution for associated connected devices and/or as a means for cloud-based storage. In certain implementations, multiple IoT robots can be registered on a single backend server 204 with the usage of a unique identifier (e.g. UID) for each robot.

Registering an IoT robot can be done in one of several ways (e.g., via apps, web services, backend services for automatic bulk UID registration at the factory, etc.).

Robot 200 can be configured to synchronize its database information with a connected cloud-based storage solution. For example, user data, state data, mapping data and security video can be safely and securely backed up to a cloud based storage. An TOT robot can also function as a local storage solution for connected TOT devices in situations where local storage is a priority. For example, security and surveillance footage can be stored on secure physical drives located inside the robot. The data on these local storage solutions can optionally be synced and backed up to a cloud based storage solution.

Further aspects and implementations of the present disclosure (including robot 200) are described herein and are further directed to mounting a device. Doing so can integrate additional components and integrate further capabilities into the described robot.

With advances in technological fields such as artificial intelligence and speech recognition software, robots increasingly have the capability to comprehend a human's speech and emotional condition and respond to the human with emotionally relevant language. Some of these robots include a CPU unit which acts as the main 'brain' of the robot while providing telecommunication capability together with other interface(s). However, such computing components are often integrated within the robot in a manner that precludes them from being easily removed or replaced. As a result, it can be difficult or impossible to upgrade such robots (e.g., to increase the capabilities, functionality, etc., of the robot beyond its original configuration).

Accordingly, as described herein in various implementations are technologies, including apparatuses, methods, machine readable mediums, and systems, that enable mounting a device. The described technologies provide numerous advantages, including enabling easy and efficient exchange, upgrade, adjustment, etc., of various components of a robot.

It can therefore be appreciated that the described technologies are directed to and address specific technical challenges and longstanding deficiencies in multiple technical areas, including but not limited to robotics, device mounting, and modular hardware design. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 7:
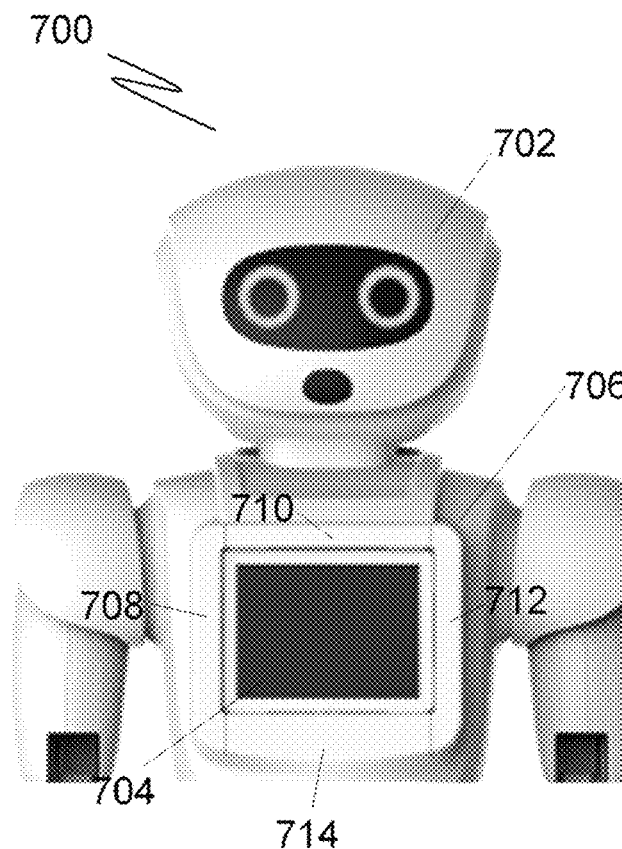
FIG. 7 illustrates an example robot with a device removably mounted on the tablet dock.

In accordance with various embodiments as shown in FIG. 7, there is a robot system 700 that includes a robot 702 driven by electronic signals, such as electrical commands from a mobile computer, such as but not limited to a tablet 704. The robot 702 can be an electromechanical machine that is operable to carry out a complex series of actions automatically according to a set of instructions, e.g., as defined by a computer program or software executed by device 704 (e.g., a tablet). The tablet 704 may be removably mounted on an apparatus 706, otherwise known as the tablet dock 706, that can be located on the exterior shell of the robot 702 near the central region, for example a chest area for a robot shaped like a human body.

The apparatus 706 or tablet dock 706 can include a first edge member 708, a second edge member 710, a third edge member 712 and a fourth edge member 714 which are arranged such that the longitudinal axis of the first edge member 708 and the third edge member 712 are substantially parallel to a first direction and the longitudinal axis of the second edge member 710 and the fourth edge member 714 are substantially parallel to a second direction (e.g., as shown in FIG. 7). In some embodiments, the edge members 708, 710, 712 and 714 are arranged to enclose a rectangular region for the tablet 704 to fit therein.

The first direction may be substantially perpendicular or orthogonal to the second direction and both the first direction and second direction are substantially parallel to the interior bottom surface of the main recess 716 or the plane on the display screen of the tablet 704 (also known as "a first plane").

Figure 8:
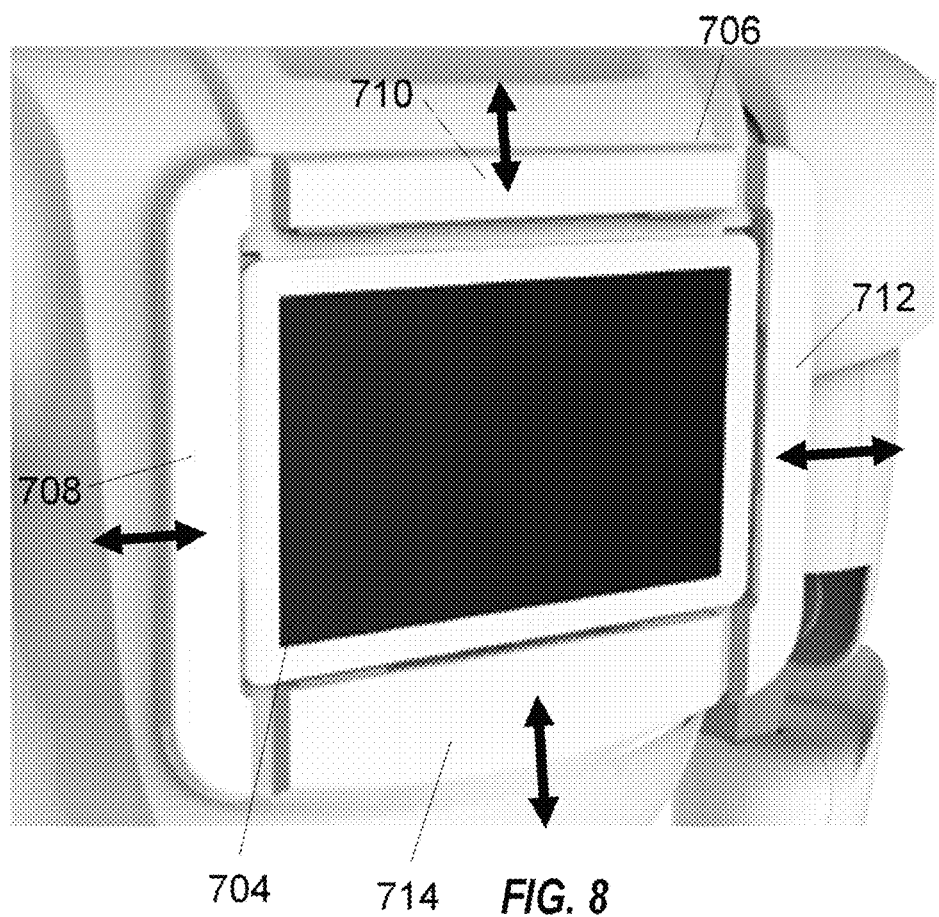
FIG. 8 illustrates an example device mounted on the tablet dock with the first and third edges slid laterally along the plane of the device.
Figure 9:
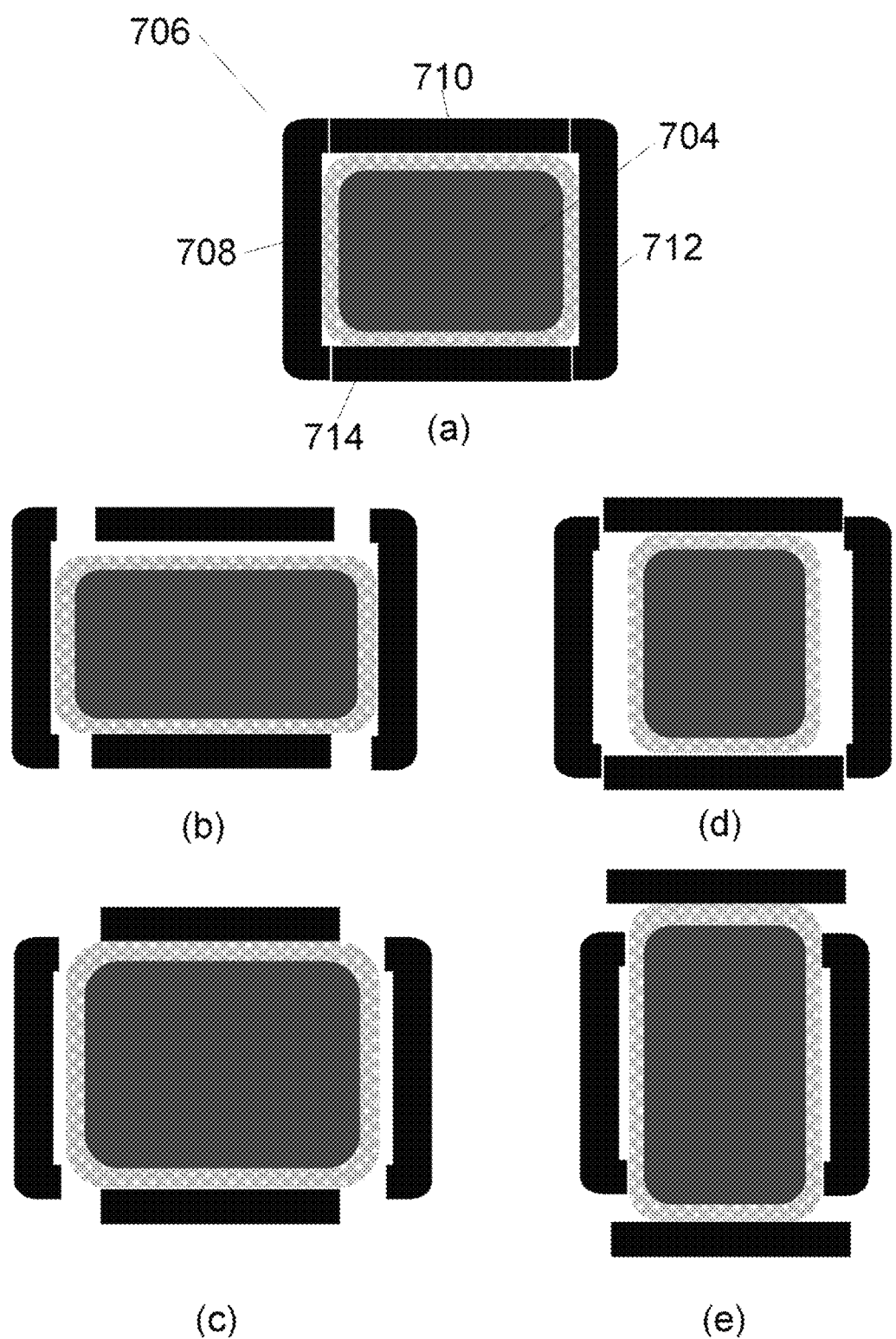
FIG. 9 illustrates example configurations in which the device dock may be adapted to accommodate devices of different lateral dimensions.

To mount the tablet 704 as shown in FIG. 8 and FIG. 9, the four edge members 708, 710, 712 and 714 may be slidably adjustable along the direction perpendicular to their respective longitudinal axis within the first plane to accommodate the lateral dimensions of the tablet 704. Once the four edge members 708, 710, 712 and 714 are slidably adjusted to accommodate the lateral dimensions of the tablet 704, the tablet 704 is mounted in place by sliding at least two opposing edge members towards each other to clamp the tablet 704. Following which, the said opposing edge members may also be locked in place to ensure that the tablet 704 is securely mounted on the tablet dock 706. The slidably adjustable edge members advantageously allow the tablet dock 706 to accommodate tablets with different lateral dimensions as shown in FIG. 9.

Figure 10:
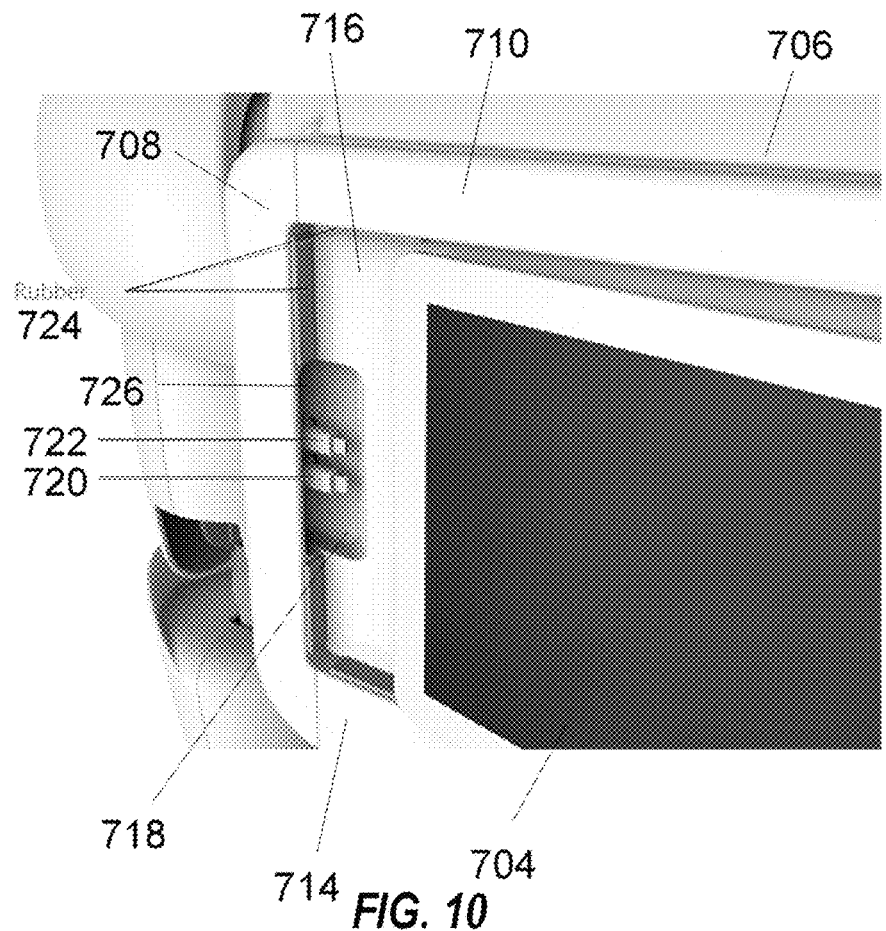
FIG. 10 illustrates an example of the main and first secondary recesses of the device dock.
Figure 11:
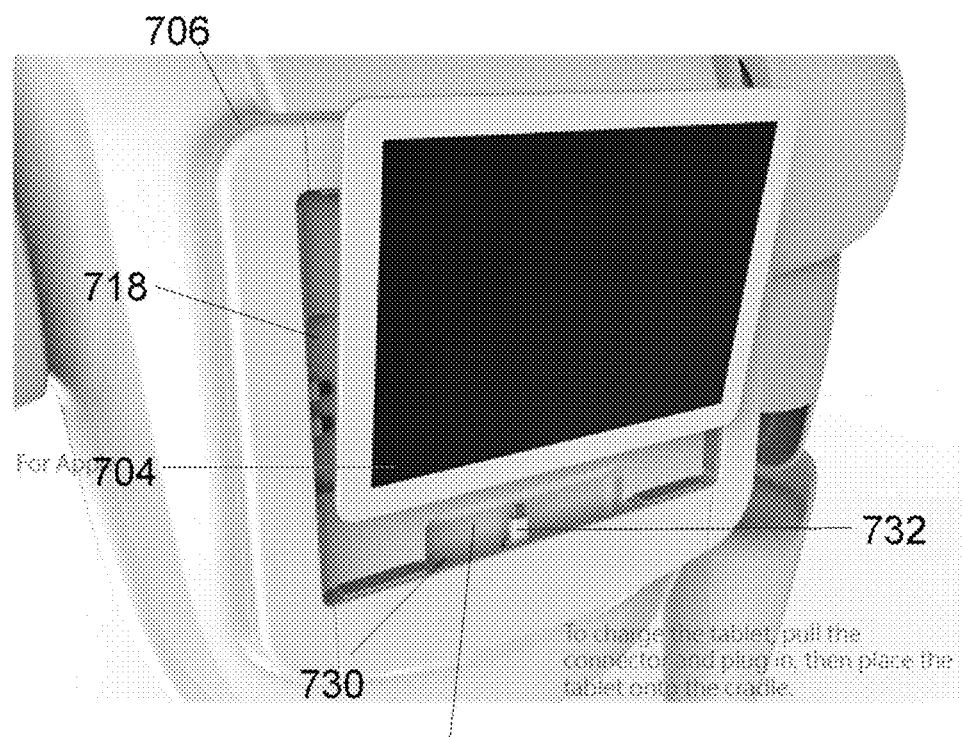
FIG. 11 illustrates an example of the first and second secondary recesses of the device dock.

In various embodiments as shown in FIG. 10 and FIG. 11, the four edge members 708, 710, 712 and 714 define the perimeter of a main recess 716 for receiving the tablet 704 such that the rear or back surface of the tablet 704 rests on the bottom of the main recess 716. In various embodiments, the length of the first edge member 708 and third edge member 712 may be substantially shorter than the length of the second edge member 710 and the fourth edge member 714.

In various embodiments, the display screen of the mounted tablet 704 may be substantially flushed with the top surface of the first edge member 708, second edge member 710, third edge member 712 and fourth edge member 714 if the depth of the main recess 716 is substantially equal to the thickness of the tablet 704. In various embodiments as shown in FIG. 8 and FIG. 9, there may be gaps near the corner of two perpendicular edges if the respective lateral dimensions of the tablet 704 are different from the length of the corresponding edge members.

In various embodiments, the tablet dock 706 can also include rubber pads 724 that are attached to an interior surface of the four edge members 708, 710, 712 and 714 such that the rubber pads 724 may come in contact with the surface along the thickness direction of the tablet 704 when the tablet 704 is docked or mounted on the tablet dock 706. The rubber pads can act as a cushion to prevent the edges from scratching the side or surface along the thickness direction of the tablet 704 when it is docked or mounted on the tablet dock 706.

In various embodiments as shown in FIG. 10 and FIG. 11, the tablet dock 706 further comprises a first secondary recess 718 (FIG. 10) and a second secondary recess 728 (FIG. 11). The first 718 and second 728 secondary recesses may be stepped from the main recess 716 (i.e. the first 718 and second 728 secondary recesses are stepped recess from the main recess 716). In various embodiments, the first secondary recess 718 may be located near the first edge 708 and may extend underneath the first edge 708.

In various embodiments, the first edge member 708 may also contain a first side recess 726 that extends inwardly from an interior sidewall, wherein the interior sidewall is parallel to the thickness direction of the first edge member 708. The first side recess 726 may be coupled to or located substantially above the first secondary recess 718. In various embodiments, the second secondary recess 728 may be located near the fourth edge member 714 and may extend underneath the fourth edge 714. Further, the fourth edge member 714 may also contain a second side recess 730 that extends inwardly from an interior sidewall, wherein the interior sidewall is parallel to the thickness direction of the fourth edge member 714. The second side recess 730 may also be coupled to or located substantially above the second secondary recess 728.

In various embodiments, the first secondary recess 718 and the first side recess 726 may be substantially elongated in the first direction. Similarly, the second secondary recess 728 and the second side recess 730 may also be substantially elongated in the second direction.

In various embodiments as shown in FIG. 10 and FIG. 11, a first connector 720 and a second connector 722 may be provided at the first secondary recess 718. By way of an example, the first connector 720 may be for connecting a phone or device from one manufacturer to an USB port and the second connector 722 may be for connecting a phone or device from another manufacturer to an USB port. Further, the first connector 720 and the second connector 722 are each linked or connected to a retractable cable (not shown) wherein the cable is provided through a first aperture and a second aperture in the first secondary recess 718 (not shown). Similarly, a third connector 732 may be provided at the second secondary recess 728 and the third connector 732 may also be linked or connected to a retractable cable 734 wherein the retractable cable 734 is provided through a third aperture 736 (as shown in FIG. 12 and FIG. 13) located at the bottom of the second secondary recess 728.

Figure 12:
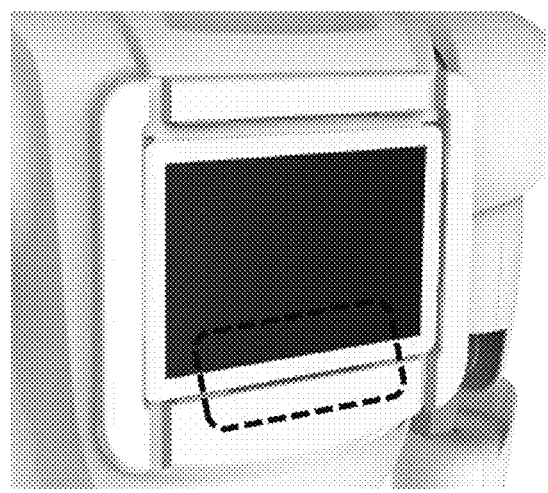
FIG. 12 illustrates an example plan view of the device dock near the second side recess along the fourth edge member illustrating schematically how the retractable cable and the second side recess combine to allow the device dock access input ports which are located at different lateral positions along the fourth edge member.
Figure 12:
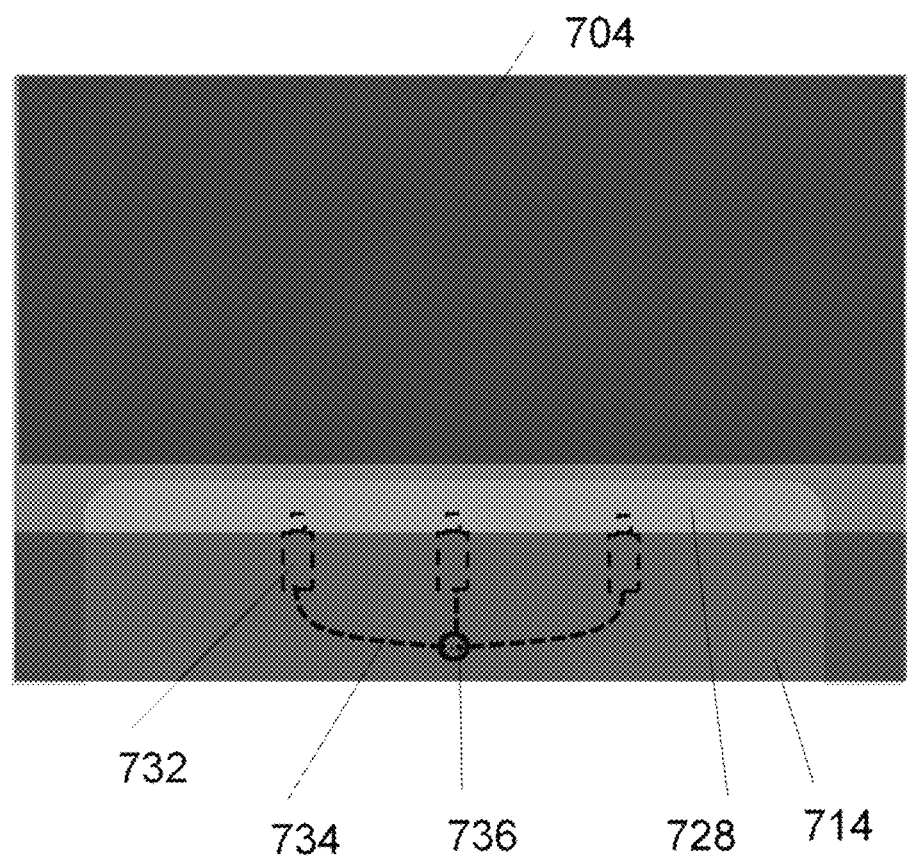
Figure 13:
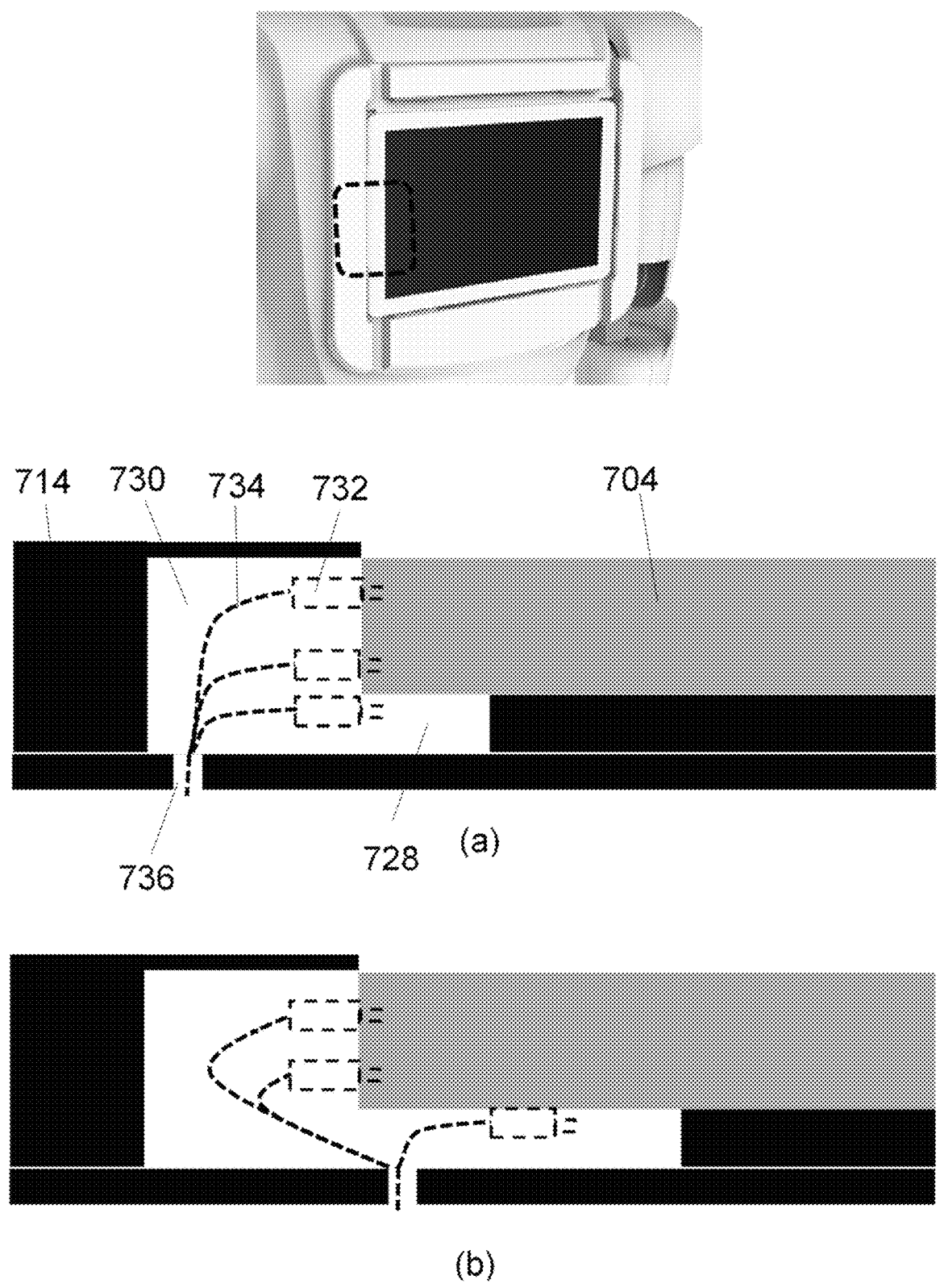
FIG. 13 illustrates an example cross-section view of the device dock near the second side recess along the fourth edge member illustrating schematically how the retractable cable and the second side recess combine to allow the device dock access input ports which are located at different distances from the bottom of the second secondary recess.

By way of an example, the elongated second side recess 730 and the third connector 732 which is linked to a retractable cable 734 may be operable to provide access to an input port of the mounted tablet 704 that is located within a range of lateral positions along the fourth edge member 714 as shown in FIG. 12. The foregoing feature allows the third connector to be adjustable along the fourth edge member to a position (may also be known as a "first position") for connection to the input port of the mobile device. Advantageously, this allows the tablet dock 706 to be connected to tablets of different makes and models whereby the input port may be located at different location along its perimeter. The elongated first side recess 726 works substantially the same way to provide access to an input port of the tablet 704 that is located within a range of lateral positions along the first edge member 708.

In various embodiments as shown in FIG. 11, providing connectors in both the first 718 and second 728 secondary recesses allows the tablet 704 to be mounted in either landscape (FIGS. 9 (a) to (c)) or portrait configuration (FIGS. 9 (d) and (e)) since connectors would be provided at both the short and long sides of the tablet 704.

A further advantage of the first side recess 726 and the second side recess 730 may be to provide access to an input port that is located within a range of position along the thickness direction of the tablet 704. As shown in FIG. 13 (a), the input port of the mounted tablet 704 may be located further away from the bottom surface of the second secondary recess 728 (or the first secondary recess 718). One situation in which this may occur is when the tablet 704 is relatively thicker. In this case, the first side recess 726 or the second side recess 730 provides the necessary spatial allowance along the thickness direction of the mounted tablet 704 for the connector to be plugged into the tablet 704 as shown in FIG. 13 (a).

In various embodiments, the second secondary recess 728 may also allow the tablet 704 to be mounted over the connector if wired connection is not required. The first secondary recess 718 similarly provides sufficient space to allow the tablet 704 to be mounted over the first connector 720 and/or the second connector 722.

The described technologies will now be described in terms of one embodiment of its operation. Prior to mounting the tablet 704 onto the tablet dock 706, the user decides whether to mount the tablet 704 in landscape or portrait configuration. Following which, the user can pull the connector (either the first connector 720, second connector 722 or the third connector 732) from the appropriate secondary recess (either the first secondary recess 718 or the second secondary recess 728) depending on whether the input port of the tablet 704 is located at the short or long edge. By way of an example, a tablet from one device manufacturer may typically have the input port located along the shorter edge. Therefore, to mount such a device/tablet in landscape configuration wherein the first edge member 708 and third edge member 712 would correspond to the two shorter edge of the tablet, the connector of the device (first connector 720) may be pulled from the first secondary recess 718 and plugged into the input port of the tablet. Thereafter, the cable that is linked to the first connector 720 may retract to pull the tablet 704 towards the tablet dock 706, i.e. the position of the first connector 720 is adjusted as the cable that is linked to the first connector 720 retracts.

Before mounting the tablet 704 into the main recess 716 of the tablet dock 706 and allowing the retractable cable to retract fully, the user may adjust the size of the main recess 716 to be larger than the size of the tablet 704 by sliding the four edge members perpendicularly with respect to their respective longitudinal axis. The tablet 704 may then be received on main recess 716 of the tablet dock 706. Thereafter, the tablet 704 may be mounted by sliding or slidably adjusting at least two opposing edge members (in this case, the first edge member 708 and third edge member 712) towards each other such that the tablet 704 gets clamped between the two said edge members. In various embodiments as shown in FIG. 8 and FIG. 9 (b), the tablet may also be clamped by the first edge member 708 and third edge member 712 while resting on the fourth edge member 714. In various embodiments and depending on the size or lateral dimensions of the tablet, the second edge member 710 and fourth edge member 714 may also be moved or slid or slidably adjusted towards each other to clamp the tablet. Once the members are moved in place to clamp the tablet, they may also be locked in place to ensure that the tablet is securely mounted on the tablet dock 706. It is to be appreciated that when the tablet 704 is mounted or clamped in landscape configuration, the first connector 720 is automatically adjusted to a position along the first edge member 708 by way of at least the retractable cable (not shown) and the first side recess 726 which allows it to be properly connected or plugged into the input port of the tablet 704.

In order to mount the tablet in the portrait configuration, the third connector 732 from the second secondary recess 728 may be used instead. When mounting in portrait configuration as shown in at least FIGS. 9 (d) and (e), the second edge member 710 and fourth edge member 714 may be moved or slid or adjusted towards each other to clamp the tablet. Depending on the length of the longer side of the tablet, there may or may not be sufficient space for the first edge member 708 and third edge member 712 to clamp the tablet 704 as shown in FIGS. 9 (d) and (e). Other embodiments in which the tablet 704 of different lateral dimensions may be mounted on the tablet dock 706 in either landscape or portrait configuration are shown in FIGS. 9 (a) to (e). It is to be appreciated that when the tablet 704 is clamped in portrait configuration, the third connector 732 is automatically adjusted to a position along the fourth edge member 714 by way of at least the retractable cable 734 and the elongated second side recess 730 which allows it to be properly connected or plugged into the input port of the tablet 704 as shown in FIG. 12 and FIG. 13.

In various embodiments, the tablet 704 may also be mounted without any connection to either of the connectors. In this case, the tablet 704 may be mounted directly above the connectors after the size of the main recess 716 is adjusted by sliding the four edges. In this case, the connectors would be pushed towards the bottom of the corresponding secondary recess, allowing the tablet 704 to be mounted properly with the back surface of the tablet 704 resting flatly on the bottom of the main recess 716.

It should be further appreciated by the person skilled in the art that variations and combinations of features described above, not being alternatives or substitutes, may be combined to form yet further embodiments falling within the intended scope of the described technologies.

For example, although the various embodiments are described in the context of a tablet, is to be appreciated that the tablet dock 706 may also be used for docking any device such as smartphone and laptops.

While the tablet dock 706 is designed to be mounted on the chest of the robot 702, it can also be used as a standalone universal tablet dock, e.g., for playing music or telecommunication. Any product that currently incorporates a mobile device dock can be improved by using the tablet dock 706.

As two opposing edge members are used to mount the tablet 704 on the tablet dock 706 by clamping, it is to be appreciated that the described technologies can be workable in various scenarios such as those where only two edge members are present.

Although the retractable cable linked to the connector provides the flexibility to access the input port which may be located at a range of lateral positions, it is to be appreciated that the connector may also attached to a mechanism that allows it to be moved laterally so as to access the input port located at a different lateral position.

Apart from USB connectors from various device manufacturers, other types of non-USB connectors to a tablet or mobile device may also be used. The first, second and third connectors may also be interchangeable to accommodate different types of input ports.

The tablet dock 706 may be used as a physical tablet mount wherein wireless connection such as Bluetooth and Wi-Fi may be used to communicate with the tablet.

Although the first, second and third apertures are located in the respective secondary recesses as described in the context of the embodiments, it may be appreciated that the first, second and third apertures may also be provided by other means, for e.g. through the respective edge members.

When the tablet 704 is connected to the robot via the connector, the supporting firmware and software in the tablet 704 may be configured to automatically adjust a robot control system settings. The adjustment of the robot control system setting is based on the type of tablet being connected.

Although the above embodiments are described in the context of a mobile device with a planar and rigid display screen, it may be appreciated that the described technologies may also be used with mobile devices with a flexible or curved screen (flexible electronics). In various embodiments, the tablet dock may be also be curved or shaped otherwise for mounting mobile devices with a flexible or curved screen.

The described technologies can further encompass various features, embodiments, and implementations, including but not limited to the following examples:

Example 1

An apparatus for mounting a mobile device comprising: a first member and a second member, wherein the second member is slidably adjustable; and a connector adjustable along either the first member or the second member to a first position, wherein when the mobile device is mounted, the connector at the first position is connected to an input port of the mobile device and the second member is slidably adjusted to clamp the mobile device between the first and second member.

Example 2

The apparatus according to example 2, wherein a longitudinal axis of the first member is parallel to a longitudinal axis of the second member.

Example 3

The apparatus according to either example 1 or 2, wherein the connector is adjustable to the first position at least by way of a retractable cable linked to the connector and a recess in either the first member or the second member.

Example 4

The apparatus according to example 3, wherein the recess in either the first member or the second member is elongated in a direction parallel to the longitudinal axis of either the first member or the second member respectively.

Example 5

The apparatus according to any one of the examples 1 to 4 further comprising a third member and a fourth member, wherein when the mobile device is mounted, the third member and fourth member are slidably adjusted to clamp the mobile device between said third member and fourth member.

Example 6

The apparatus according to example 5, wherein a longitudinal axis of the third member or fourth member is perpendicular to a longitudinal axis of the first member or the second member.

Example 7

The apparatus according to either example 5 or 6, wherein the first member, second member, third member and fourth member each comprises at least one rubber pad on a surface for clamping the mobile device.

Example 8

The apparatus according to any one of examples 1 to 7, wherein the connector is interchangeable to a second connector for connection to a different type of mobile device.

Example 9

The apparatus according to any one of examples 1 to 8, wherein the apparatus is mounted on an exterior shell of a robot.

Example 10

The apparatus according to example 9, wherein the apparatus is mounted on a chest area on the exterior shell of the robot.

Example 11

The apparatus according to any one of examples 1 to 10, wherein instructions stored in the mobile device are operable to update a control setting when the connector is connected to the input port.

Example 12

A method for mounting a mobile device comprising: connecting a connector to an input port of the mobile device; adjusting a position of the connector; and clamping the mobile device between a first member and a second member; wherein when the mobile device is clamped, the connector is adjusted to a first position along either the first member or the second member.

Example 13

The method according to example 12, wherein a longitudinal axis of the first member is parallel to a longitudinal axis of the second member.

Example 14

The method according to either example 12 or 13, wherein the connector is adjusted to the first position at least by way of a retractable cable linked to the connector and a recess in either the first member or the second member.

Example 15

The method according to example 14, wherein the recess in either the first member or the second member is elongated in a direction parallel to the longitudinal axis of either the first member or the second member respectively.

Example 16

The method according to any one of the examples 12 to 15 further comprising clamping the mobile device between a third member and a fourth member.

Example 17

The method according to example 16, wherein a longitudinal axis of the third member or fourth member is perpendicular to a longitudinal axis of the first member or the second member.

Example 18

The method according to either example 16 or 17, wherein the first member, second member, third member and fourth member each comprises at least one rubber pads on a surface for clamping the mobile device.

Example 19

The method according to any one of examples 12 to 18, wherein the connector is interchangeable for a second connector for connection to a different type of mobile device.

Example 20

The method according to any one of examples 12 to 19, wherein the apparatus is mounted on an exterior shell of a robot.

Example 21

The method according to any one of example 20, wherein the apparatus is mounted on a chest area of the exterior shell of the robot.

Example 22

The method according to any one of examples 12 to 21 further comprising updating a robot control system setting by a software in the mobile device when the connector is connected to the input port.

In addition to the referenced connections and associated power and signaling systems, in certain implementations the described robot device docking system can enable multiple tablet and screen connection systems and methods. An example robot device docking system can include connecting a display or touchscreen device through multiple display or touchscreen connections. Such connection options can include: Low-voltage Differential Signaling (LVDS), High-definition Multimedia Interface (HDMI), Display Port (DP), Peripheral Component Interconnect Express (PCIe), and Universal Serial Bus (USB).

An example robot device docking system can include connecting a tablet or mobile computing device through multiple networking connections. The networking options can include: Wi-Fi, Bluetooth, Ethernet, USB, and proprietary connections. The power connection options can include both fixed voltage and variable voltage power connections. Fixed voltage power connection options can include standard power lines (e.g. 3V, 5V, 12V) available within the LVDS, HDMI, DP and USB connections. Dual voltage power connection options can include a fast-charging USB protocol with both a standard 5V charging voltage and a higher 12V charging voltage. A fully variable power connection may be used when a power connection can adapt to various connected devices with varied power requirements. Some devices can be mounted without any wired connections, relying on wireless networking and power delivery solutions (e.g. wireless charging).

A robot head or face mounting system (e.g., as shown in FIG. 7) can include multiple optional face types for various input and/or output requirements. The mounting system can include options for an LED array face and an LCD panel face. A robot control system can vary audio/visual (A/V) content displayed on one or more screens based on the connected face type. For example, when an LED array face is mounted, A/V content may be displayed on a different installed screen in addition to any connected display, via Wi-Fi, Bluetooth or over an Internet connection. Additionally, the different or connected display can show information, data or other forms of device feedback. In another example, when a face LCD panel is mounted, A/V content, information, data and other forms of device feedback can be shown directly on the face LCD panel. The face LCD panel can also function as an output device for robot expressions.

After mounting one of a plurality of available output devices to a robot or human interaction system, one or more parameters may be set as variable inputs to an Artificial Intelligence (AI) system controller. Parameters may be set to functionally adjust a system state machine, A/V output and interaction control. For example, a state machine adjustment can be dependent on the presence of a mounted arm. Functions relying on use of an optional arm can be activated or de-activated based on the availability of a mounted arm. In some cases, mounting different audio output devices can vary the quality, volume and type of voice produced by a robot speech controller. An interaction controller can choose to display or output one or more robot expressions that are compatible with available output devices.

After mounting one of a plurality of available input devices or sensors to a robot or human interaction system, one or more parameters may be set as variable inputs to an AI system controller. In certain implementations, robot control engine 124 (as shown in FIG. 1 and described herein) can implement the reference AI functions/operations. For example, robot control engine 124 can configure the described robot system to automatically switch between internal and mounted device sensors based on factors including: power consumption, quality, speed or accuracy. Examples include: internal microphone and a tablet mic, internal camera and a tablet camera, internal inertial measurement unit (IMU) and a tablet IMU, internal and external ambient light sensors, internal and tablet touchscreens or internal or tablet depth camera(s).

By way of further illustration, it can be appreciated that the described robot can include or integrate various sensors such as cameras, microphones, etc. Additionally, in scenarios in which other devices (e.g., smartphones, tablets, other peripherals) are mounted to the referenced robot, such devices themselves may further incorporate their own respective sensors (e.g., a camera, microphone, etc. integrated within a smartphone). In certain implementations, the referenced sensors which are integrated within a connected/mounted device may further be accessible to the robot (e.g., via various protocols). Accordingly, as described herein, in scenarios in which multiple sensors are available to the robot (e.g., one camera incorporated within the robot itself and another camera integrated within a smartphone mounted to the robot), the described robot control engine can determine which sensor may be most suitable for a particular task. For example, one camera may provide superior image quality in low light situations, while another may have better zoom capabilities. The robot can then utilize the identified sensor for a particular task.

In certain implementations, the described technologies can be further configured to utilize various sensors (e.g., sensors integrated within the robot and/or sensors integrated within devices docked to the robot) in connection with operations of the robot originating from/pertaining to a personal assistant. For example, in a scenario in which a user utilizes a personal assistant to control operations of the robot, it may be advantageous to utilize certain sensors of the robot in performance of such operations/task. By way of illustration, in a scenario in which one user utilizes a personal assistant to initiate a command with respect to the robot (e.g., a voice command directing the robot to "take this book to Jimmy"), it may be advantageous for the robot to perform various verification operations when performing/completing such a task. For example, the robot can utilize various sensors (e.g., cameras, fingerprint or other biometric sensors, etc.) to confirm the identity of an individual ("Jimmy") prior to completing the task. Accordingly, in certain implementations the described technologies can further utilize integrated/available sensors (e.g., a camera integrated within the robot, a fingerprint sensor integrated within a smartphone docked to the robot, etc.) to perform such verification/confirmation. Moreover, in scenarios in which multiple sensors are available, the described technologies can be configured to select a sensor determined to be best suited for the task (e.g., using a camera integrated within a docked smartphone which is determined to capture higher resolution images).

Additionally, in certain implementations the described technologies can further enable a user to customize the performance of certain tasks performed by the robot based on the available sensors/capabilities of the robot and/or its docked device(s)/peripherals. For example, upon receiving the instruction referenced above (a voice command directing the robot to "take this book to Jimmy"), the personal assistant can further inquire of the user regarding which of the available verification options the user wishes to utilize in completing the task (e.g., visual/photographic identity verification of the recipient, biometric verification, e.g., using a fingerprint sensor, etc.).

In certain implementations, the described technologies can further prompt the user to provide an additional device/peripheral. For example, if the user wishes to use fingerprint/biometric authentication but such sensors are not available on the robot, the described technologies can prompt the user to attach, dock, etc., a device or peripheral that incorporates the requested sensor/capability (e.g., the personal assistant can response "I'm sorry, the robot does not currently have a fingerprint sensor. Please dock your smartphone to the robot to enable this functionality."). It should be understood that the scenarios described herein are provided by way of example and that the described technologies can be configured in any number of other ways with respect to any number of other technologies.

When mounting a device on a robot or human interaction system, the device may have an internal power source (e.g. lithium-ion battery). Accordingly, the described technologies can provide a charging solution for a mounted device battery. For example, in certain implementations the described technologies (e.g., robot control engine 124) can enable various status feedback operations for intelligent charging control including scheduling and target battery levels. In certain implementations, the described technologies can utilize a battery integrated within a mounted device as a primary or secondary power source for the robot/system. In doing so, the robot can utilize energy stored within a mounted device to power operations of the robot. Moreover, in certain implementations the described technologies can be configured to monitor internal and external battery health. To prevent batteries from draining their power, a system can use a home base charging solution or a wireless charging solution.

Additionally, the described robot device docking system can be implemented with respect to multiple networking modes or states (e.g., as depicted in FIG. 6 and described herein). In certain implementations, the manner in which the described technologies operate (e.g., with respect to various docked devices) can be adjusted or configured based on aspects or capabilities of the mounted devices. For example, in scenarios in which networked devices (e.g., smartphones, tablets, etc.) establish/maintain connectivity to the internet, the described technologies can automatically switch between various modes (e.g., online and offline networking modes). In an offline mode, the described technologies can utilize keyword-based AI speech recognition, locally generated text-to-speech voice output, local processing, local data storage and local user account login methods. In an online mode, the described technologies can utilize cloud-implemented AI speech recognition and speech output, cloud and smart home connectivity, cloud based storage solutions and/or social network user account login techniques.

It should also be noted that while the technologies described herein are illustrated primarily with respect to multi-device robot control, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described herein are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Figure 14:
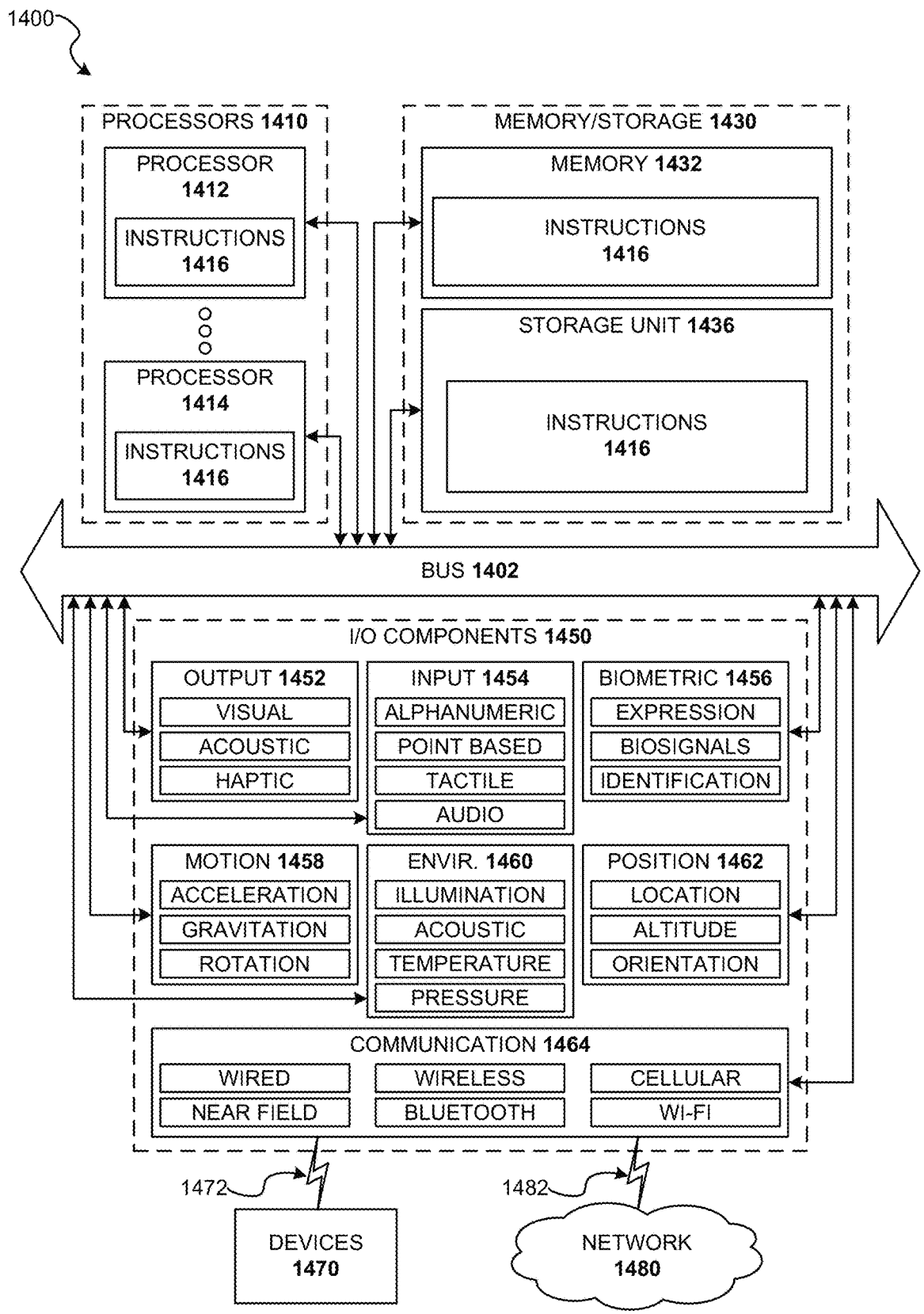
FIG. 14 is a block diagram illustrating components of a machine able to read instructions from a machine-readable medium and perform one or more of the methodologies discussed herein, according to an example embodiment.

FIG. 14 is a block diagram illustrating components of a machine 1400, according to some example implementations, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein can be executed. The instructions 1416 transform the general, non-programmed machine into a particular machine programmed to carry out the described and illustrated functions in the manner described. In alternative implementations, the machine 1400 operates as a standalone device or can be coupled (e.g., networked) to other machines. In a networked deployment, the machine 1400 can operate in the capacity of a server machine or a client machine in a server-client network environment, or as a peer machine in a peer-to-peer (or distributed) network environment. The machine 1400 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 can include processors 1410, memory/storage 1430, and I/O components 1450, which can be configured to communicate with each other such as via a bus 1402. In an example implementation, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1412 and a processor 1414 that can execute the instructions 1416. The term "processor" is intended to include multi-core processors that can comprise two or more independent processors (sometimes referred to as "cores") that can execute instructions contemporaneously. Although FIG. 14 shows multiple processors 1410, the machine 1400 can include a single processor with a single core, a single processor with multiple cores (e.g., a multi-core processor), multiple processors with a single core, multiple processors with multiples cores, or any combination thereof.

The memory/storage 1430 can include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 can also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store instructions (e.g., instructions 1416) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 can include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 can include many other components that are not shown in FIG. 14. The I/O components 1450 are grouped according to functionality merely for simplifying the following discussion and the grouping is in no way limiting. In various example implementations, the I/O components 1450 can include output components 1452 and input components 1454. The output components 1452 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 1450 can include biometric components 1456, motion components 1458, environmental components 1460, or position components 1462, among a wide array of other components. For example, the biometric components 1456 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 can include acceleration sensor components (e.g., accelerometer), gravitation sensor components, rotation sensor components (e.g., gyroscope), and so forth. The environmental components 1460 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 1462 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1450 can include communication components 1464 operable to couple the machine 1400 to a network 1480 or devices 1470 via a coupling 1482 and a coupling 1472, respectively. For example, the communication components 1464 can include a network interface component or other suitable device to interface with the network 1480. In further examples, the communication components 1464 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 can be another machine or any of a wide variety of peripheral devices (e.g., a peripheral device coupled via a USB).

Moreover, the communication components 1464 can detect identifiers or include components operable to detect identifiers. For example, the communication components 1464 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1464, such as location via Internet Protocol (IP) geolocation, location via Wi-Fi® signal triangulation, location via detecting an NFC beacon signal that can indicate a particular location, and so forth.

In various example implementations, one or more portions of the network 1480 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 can include a wireless or cellular network and the coupling 1482 can be a Code Division Multiple Access (CDMA) connection, a Global System for Mobile communications (GSM) connection, or another type of cellular or wireless coupling. In this example, the coupling 1482 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 can be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 can be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
receiving, at a robot, one or more inputs;
providing, by the robot, the one or more inputs to a personal assistant;
receiving, by the robot and from the personal assistant, one or more commands directed to an external device;
determining, by the robot, a connectivity status of the external device;
based on (a) the one or more commands and (b) the connectivity status of the external device, maneuvering the robot in relation to a location associated with the external device; and
initiating a transmission of one or more instructions from the robot to the external device.

2. A robot comprising:
a processing unit comprising:
a sensor array;
a first communication interface for connection to a wide area network at least for receiving inputs from a user regarding multi-operation mechanical tasks and multi-operation electronic tasks for said robot to perform in response to said inputs;
a second communication interface for connection to devices within a designated premises at least for communicating said user input data to said devices, for receiving output from said devices and for providing said output to said first communication interface;
a central processing logic to process the output of said sensor array and of said first communication interface and to generate multiple robot operations therefrom;
a robot task effector comprising:
proximity sensors having an output indicating proximity of said robot to at least one object;
means for said robot to effect motion of said robot and/or of a portion of said robot; and
a robotics controller to receive said robot tasks and output of said proximity sensors and to generate therefrom at least motion control signals for said means, said motion to enable said robot to effect said robot operations in the presence of said at least one object.

3. The robot according to claim 2, wherein said sensor array is selected from the group consisting of a video camera, a microphone, an infra-red sensor, laser scanners, laser strip detectors, global positioning system and short-range radar.

4. The robot according to claim 2, wherein said robotics controller being selected from the group consisting of applications, module, executed instructions, instructions implemented by said processing unit or said central processing logic.

5. The robot according to claim 2, wherein said means for said robot to effect motion of said robot comprises servomotors.

6. The robot according to claim 2, wherein said robotic controller transmits feedback signals to said central processing logic.

7. The robot according to claim 2, wherein said robot being in communication with a memory, said memory storing processed data or input data, or storing instructions that, when executed, cause said robot to perform operations.

8. The robot according to claim 2, wherein said robot through said first communication interface communicates via a network or the Internet with external devices.

9. The robot according to claim 8, wherein said external devices being selected from the group consisting of sensors, video cameras, smart devices, mobile devices, heater, air-conditioner, lighting and television.

10. The robot according to claim 2, wherein said robot being in communication with an external authorization device for implementation of an authentication process.

11. The robot according to claim 10, wherein said authentication process includes determining a location of said robot or authentication of pre-authorized or registered users and robots.

12. The robot according to claim 2, wherein said first communication interface comprising a touch-enabled display having an output connected to said user data input or a personal assistant communicating instructions or a tablet.

13. The robot according to claim 2, wherein said first and second communication interfaces are mounted on said robot.

14. The robot according to claim 12, wherein said robot including a dock located on an exterior shell of the robot, wherein said first communication interface being mounted on said dock.

15. The robot according to claim 2, wherein said robot comprises a robot control engine to implement gesture interpretation for said robot when performing said multi-operation mechanical tasks and multi-operation electronic tasks.

16. A robot comprising:
a processing device including a central processing logic, a sensor data input and a user data input, wherein said central processing logic generating control signals based on results from processing of input data;
a memory in communication with said processing device, and said memory storing processed data, input data, and instructions, wherein, when said instructions are executed, cause said robot to perform operations;
a first communication interface for connection externally to a wide area network at least for receiving said user data input and having inputs received from a user;
a second communication interface for connection locally to devices within a designated premises at least for communicating said user input data to said devices, for receiving output from said devices and for providing said output to said first communication interface;
a sensor array having an output connected to said sensor data input;
proximity sensors having an output;
a robotics controller receiving said control signals and having an input connected to said proximity sensors; and
means for said robot to effect motion of said robot, said means being connected to said robotics controller;
wherein said central processing logic processes input data from said sensor data input and said user data input and extracts multiple robot operations from commands received from said sensor data input and said user data input.

* * * * *